United States Patent
Tiku et al.

(10) Patent No.: US 12,141,928 B2
(45) Date of Patent: Nov. 12, 2024

(54) NAVIGATION PATHS FOR DIRECTING USERS TO FOOD ITEMS BASED ON MEAL PLANS

(71) Applicant: Micron Technology, Inc., Boise, ID (US)

(72) Inventors: Saideep Tiku, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 107 days.

(21) Appl. No.: 17/823,773

(22) Filed: Aug. 31, 2022

(65) Prior Publication Data

US 2024/0070993 A1  Feb. 29, 2024

(51) Int. Cl.
*G06T 19/00* (2011.01)
*G06Q 30/0601* (2023.01)
*G06V 20/68* (2022.01)

(52) U.S. Cl.
CPC ....... *G06T 19/006* (2013.01); *G06Q 30/0639* (2013.01); *G06Q 30/0643* (2013.01); *G06V 20/68* (2022.01)

(58) Field of Classification Search
CPC . G06Q 30/0639; G06Q 30/0643; G06V 20/68
See application file for complete search history.

(56) References Cited

U.S. PATENT DOCUMENTS

| | | | | |
|---|---|---|---|---|
| 9,640,088 | B1* | 5/2017 | Whitehurst | G06K 19/0723 |
| 11,410,218 | B1* | 8/2022 | O'Brien | G06Q 30/0633 |
| 2011/0264554 | A1* | 10/2011 | King | G06Q 30/0633 |
| | | | | 235/383 |
| 2013/0085345 | A1* | 4/2013 | Geisner | G06Q 30/00 |
| | | | | 600/300 |
| 2015/0278849 | A1* | 10/2015 | Reichert | G06Q 30/0276 |
| | | | | 705/14.41 |
| 2018/0218351 | A1* | 8/2018 | Chaubard | G07G 1/0081 |
| 2019/0228856 | A1* | 7/2019 | Leifer | G06F 16/9035 |
| 2022/0021923 | A1* | 1/2022 | McDevitt | H04N 21/8133 |
| 2022/0036432 | A1* | 2/2022 | Beltran | G06Q 30/0205 |
| 2022/0309557 | A1* | 9/2022 | Donnels | G06Q 30/0641 |
| 2022/0319666 | A1* | 10/2022 | Kim | G06Q 50/22 |

(Continued)

FOREIGN PATENT DOCUMENTS

CN       107358508 B   *   7/2021   ......... G06Q 30/0633

OTHER PUBLICATIONS

English translation of CN 107358508 B (Year: 2021).*

*Primary Examiner* — Grace Q Li
(74) *Attorney, Agent, or Firm* — Harrity & Harrity, LLP

(57) ABSTRACT

In some implementations, an extended reality (XR) device may receive, via an interface of the XR device, an input associated with meals of a user associated with the XR device. The XR device may determine, based on the input, a meal plan for the user of the XR device, wherein the meal plan is associated with target meals. The XR device may determine, based on recipes for the target meals, a list of food items for preparing the target meals associated with the meal plan. The XR device may provide, via the interface, the list of food items and the target meals. The XR device may provide, via the interface, an in-store navigation path to direct the user of the XR device via overlayed audio-visual cues to locations within a physical retail store to pick up the food items.

25 Claims, 15 Drawing Sheets

(56) References Cited

U.S. PATENT DOCUMENTS

| | | | | |
|---|---|---|---|---|
| 2023/0196126 A1* | 6/2023 | Kim | ........................ | G06N 5/022 |
| | | | | 706/46 |
| 2023/0326574 A1* | 10/2023 | Zhao | ...................... | G16H 20/60 |
| | | | | 705/2 |
| 2024/0013287 A1* | 1/2024 | Shah | .................. | G06Q 30/0639 |

\* cited by examiner

NAVIGATION PATHS FOR DIRECTING USERS TO FOOD ITEMS BASED ON MEAL PLANS

TECHNICAL FIELD

The present disclosure generally relates to extended reality (XR) devices and, for example, providing navigation paths for directing users to food items based on meal plans.

BACKGROUND

Extended reality (XR) may blend a physical world (or real world) and a virtual world (or digital world) to create a more personalized, immersive visual experience. XR may encompass augmented reality (AR), mixed reality (MR), and virtual reality (VR). AR may provide an interactive experience of a physical-world environment, in which objects that reside in the physical world may be enhanced by computer-generated perceptual information. MR may merge physical and virtual worlds to produce new environments and visualizations, in which physical and digital objects may co-exist and interact in real time. VR may provide a fully virtual world without an intervention of the physical world. XR may be across multiple sensory modalities, including visual, auditory, haptic, somatosensory, and/or olfactory. XR may be useful across a wide variety of applications, such as gaming, healthcare, retail, customer service, and/or manufacturing.

DETAILED DESCRIPTION

Figure 1A:
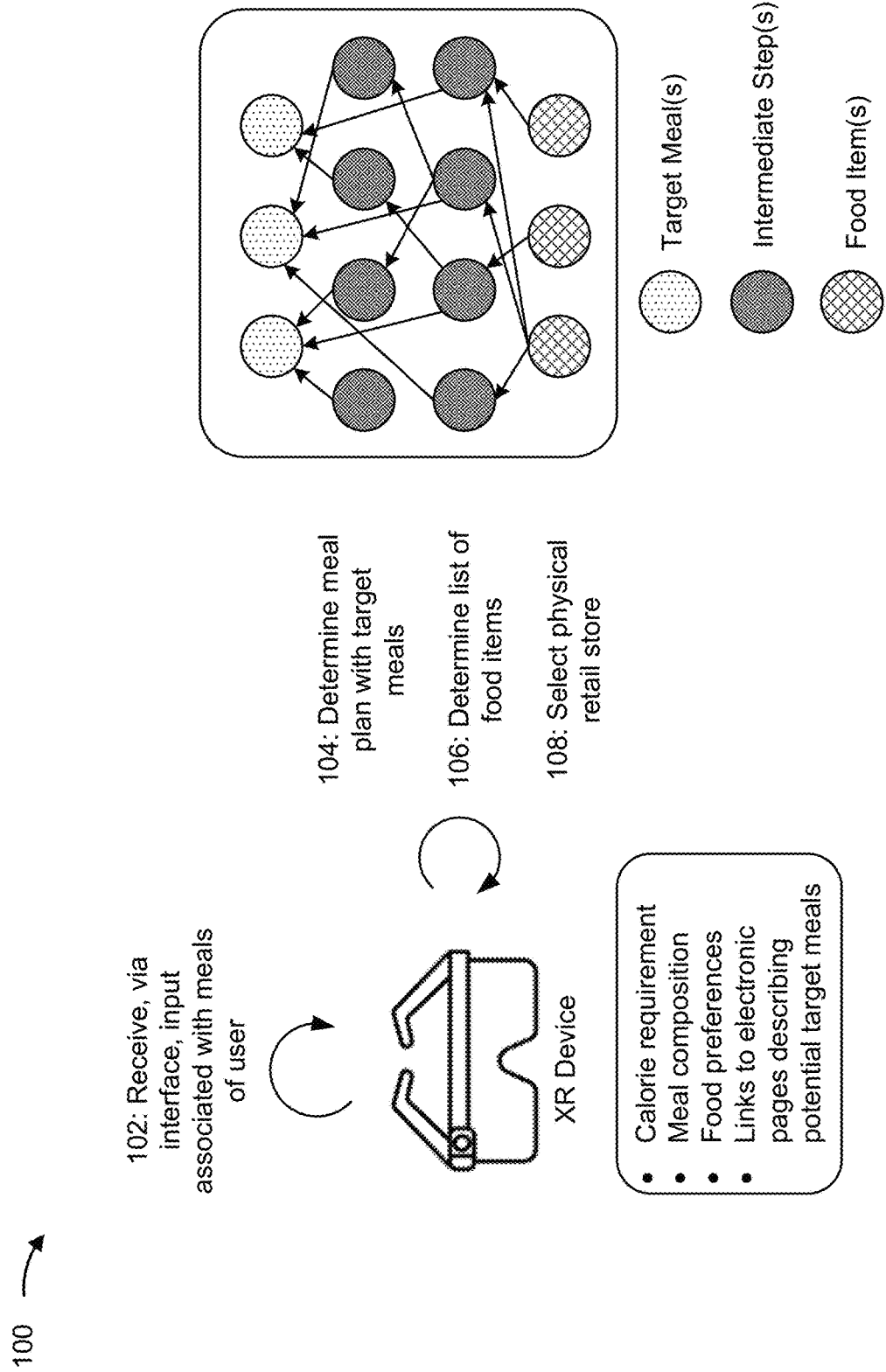
FIGS. 1A-1C are diagrams of an example related to providing navigation paths for directing users to food items based on meal plans.

A person may formulate a meal plan that consists of a plurality of target meals. The meal plan may be for a person or a group of people (e.g., a family). The meal plan may be for a social event (e.g., a dinner party). The meal plan may need to align with various food preferences (e.g., vegan or gluten-free). The meal plan may be associated with a certain objective, such as to reduce calorie intake, increase protein intake, decrease sugar intake, and so on. The person may formulate the meal plan to ensure that the person satisfies a certain calorie requirement, avoids certain foods, consumes certain foods with a higher frequency, and so on. Each target meal may use a variety of ingredients. Some ingredients may be used to form several target meals, whereas other ingredients may be specific to a certain target meal and cannot be used to form other target meals.

The person may search for different recipes for preparing the target meals. For each recipe, the person may need to determine whether ingredients needed for that recipe are aligned with the food preferences. When one recipe includes ingredients that are not aligned with the food preferences (e.g., eggs), the person may search for another recipe for preparing the same target meal or may change to a different target meal altogether. After settling on which target meals are to be prepared, the person may compile a list of different ingredients needed to make the target meals. The person may need to cross-reference ingredients associated with different target meals to account for certain ingredients which may be used for different target meals. The person may determine whether one ingredient may be substituted with another ingredient, such as an ingredient that is already being used to prepare another target meal. For example, if a first recipe uses honey and a second recipe uses maple syrup, the person may determine whether maple syrup could be used for both recipes.

The person may compile a list of food items to be purchased, which may be based on the ingredients needed to prepare the target meals. The person may search for a physical retail store that carries the food items needed to prepare the target meals. The physical retail store may be a brick-and-mortar store, as opposed to an online store. Alternatively, the person may search, using an online search engine, for physical retail stores within a vicinity that carry the food items needed to prepare the target meals. In some cases, a single physical retail store may not carry all of the food items, and the person may need to visit multiple physical retail stores to purchase all of the food items.

After the person forms the list of food items and determines the physical retail store to visit, the person may arrive at the physical retail store. If the person is already familiar with the physical retail store, the person may know which areas of the physical retail store (e.g., which aisles of the store) carry the food items on the list. If the person is not familiar with the physical retail store, the person may explore the different aisles of the physical retail store until the food items are found. The person may pick up the food items on the list, and then checkout of the physical retail store.

The person may spend an inordinate amount of time searching for target meals. The person may need to determine which target meals are aligned with the food preferences, which may involve studying the recipes associated with the target meals. The recipes may indicate required ingredients and/or nutritional information associated with the target meals. In other words, the person may need to look at the recipes to determine whether the associated target meals are suitable or not, and the person may waste time looking at recipes that cannot be used. The person may waste computing resources (e.g., memory, processing, and/or battery resources) and network resources when searching for this information. The person may be unaware of ingredient substitutions and/or additional target meals that may be prepared using existing ingredients, since each recipe is only tailored to the associated target meal and is not correlated with other recipes for other target meals. The person may be unaware of additional food items, which when combined with existing food items, may result in additional target meals that are aligned with the food preferences. The person may waste computing resources (e.g., memory, processing, and/or battery resources) and network resources when searching to determine whether one food item may be used as a substitute for another food item, determining what other meals a food item may be used for, etc. The person may need to manually prepare the list of food items, which may involve removing redundant food items (e.g., when the same food item can be used for multiple target meals).

The person may have to travel from store to store looking for certain food items, since a first physical retail store the person visits may not have every food item needed, which may waste fuel resources of the person's vehicle and may contribute to wear and tear on the person's vehicle. After the person arrives at the physical retail store, the person may be unable to quickly locate the food items on the list. The person may need to walk aisle-to-aisle to look for the food items on the list. Sometimes, even if the person is in the correct aisle, locating a specific food item on a shelf may be cumbersome when there are a large number of food items to choose from. In some cases, the person may believe a certain food item is in a certain aisle of the store, but that food item may actually be in a different aisle and the person may waste time searching for the food item. The person may wish to ask a store employee for assistance, but a store employee may not be easily found. The above issues may complicate a meal planning process for the person.

In some implementations described herein, to solve the problems described above, as well as deriving a list of food items and directing a person to locations associated with the food items, a solution is described herein for providing navigation paths for directing users to food items based on meal plans using extended reality (XR). An XR device may receive, via an interface of the XR device, an input associated with meals of a user (e.g., a user of the XR device). The input may include a calorie requirement and/or a food preference. The XR device may determine, based on the input, a meal plan for the user of the XR device, where the meal plan is associated with target meals. The XR device may determine, based on recipes for the target meals, a list of food items (e.g., ingredients) for preparing the target meals associated with the meal plan. The XR device may provide, via the interface, the list of food items and the list of target meals. The XR device may provide, via the interface, an in-store navigation path to direct the user of the XR device via overlayed audio-visual cues to locations within a physical retail store to pick up the food items. As used herein, "audio-visual cues" may refer to audio and/or video cues. In some implementations, the navigation path may be for multiple physical retail stores. The user may not necessarily find every food item in a single physical retail store, so the user may be directed to multiple physical retail stores to purchase all of the needed food items. The navigation path may involve directing the user in a first physical retail store, in a second physical retail store, and so on.

Alternatively, the XR device may provide, to a server, an indication of the input. The server may determine, based on the input, the meal plan. The server may determine the list of food items. The server may provide, to the XR device, an indication of the list of food items and the target meals. In this implementation, some processing may be offloaded to the server, instead of being performed locally at the XR device. The server may be associated with an edge computing system or a cloud computing system.

In some implementations, when directing users to food items based on meal plans using XR, the user may be presented with the meal plan including the target meals, which may be based on the food preferences (and other inputs) provided by the user. The user may not need to spend time thinking of target meals, researching recipes associated with the target meals, and studying ingredients and nutritional information associated with the recipes. Rather, after specifying the food preferences, the user may be automatically presented with the meal plan consisting of the target meals. The user may have an option to accept or decline certain target meals, which may influence future target meals that are recommended for the user. The user may be presented with recommendations for additional target meals and/or additional food items for preparing additional target meals, which may be aligned with the food preferences. The user may be automatically presented with the list of food items, and modifying the target meals may automatically update the list of food items. The user may be guided within the physical retail store to find the food items to be purchased. The user may be presented with the overlayed audio-visual cues, which may help the user to navigate through the aisles in the physical retail store and locate the food items to be purchased. As a result, the user does not need to waste time finding the food items in the physical retail store and/or asking store employees for assistance.

In some implementations, the XR device may dynamically adjust the meal plan and the navigation path based on food item and/or ingredient availability. The XR device may dynamically adjust a target meal selection based on the user's past reviews of previous target meals or preferences for certain food items. The XR device may be able to adjust the target meal selection with a higher predictive accuracy by utilizing the user's past reviews and the preferences for certain food items.

Figure 1B:
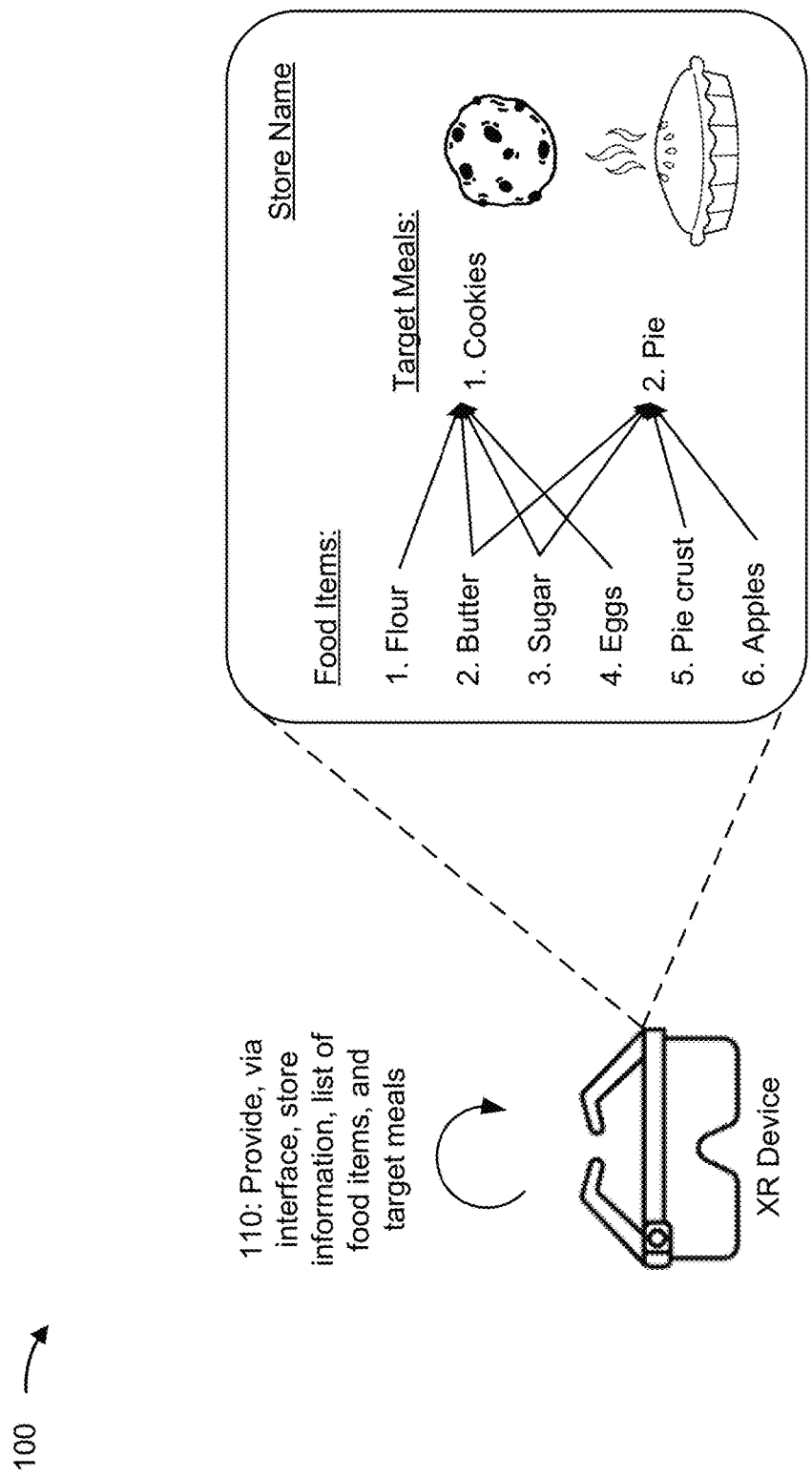
Figure 1C:
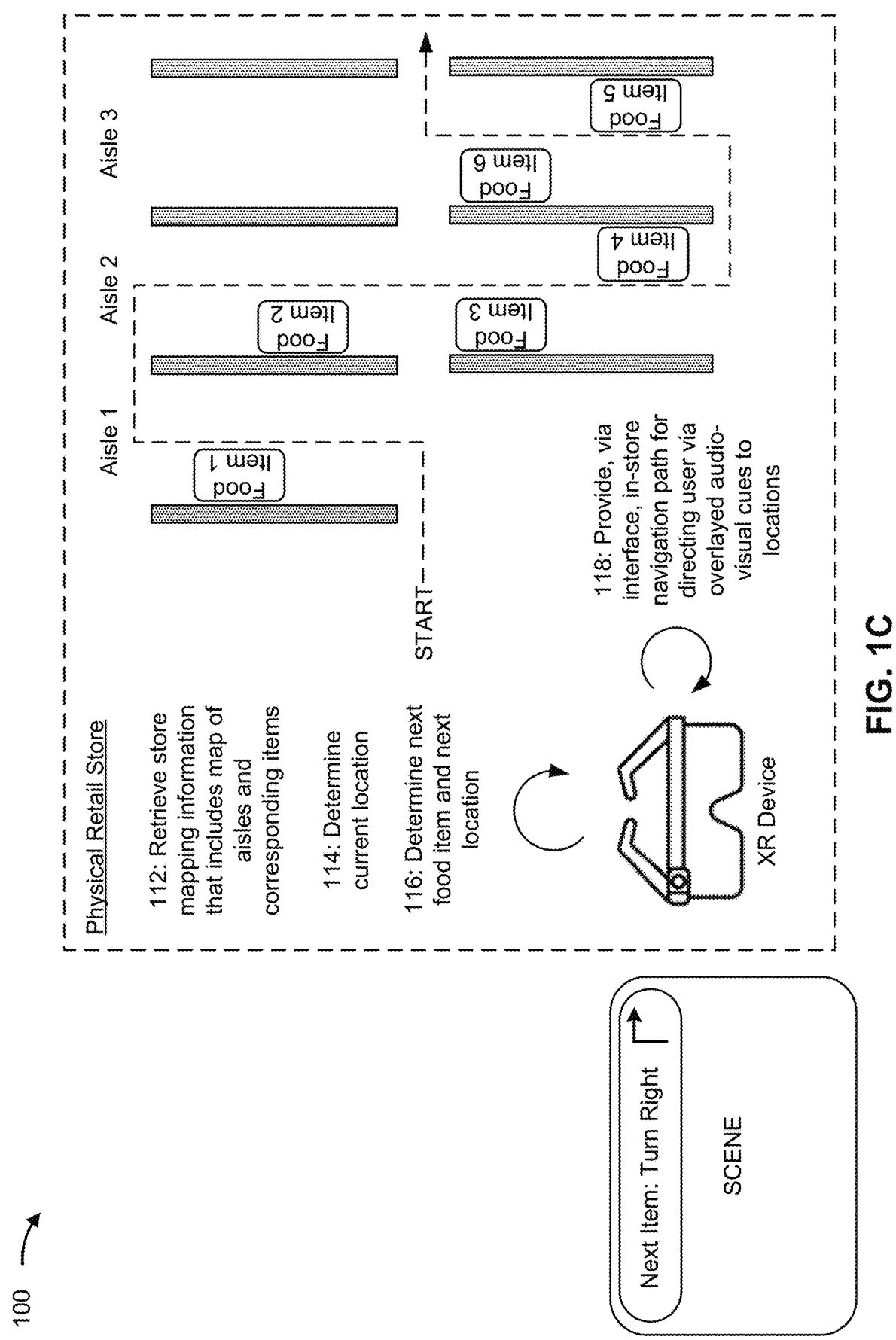

FIGS. 1A-1C are diagrams of an example 100 related to providing navigation paths for directing users to food items based on meal plans. As shown in FIGS. 1A-1C, example 100 includes an XR device and a server. These devices are described in more detail in connection with FIGS. 8 and 9.

In some implementations, an XR device may be a head-mounted display worn by a user. Alternatively, the XR device may be a mobile device carried by the user. The XR device may provide augmented reality (AR), mixed reality (MR), and/or virtual reality (VR) capabilities. In some implementations, the server may be associated with a cloud computing system or an edge computing system. "User," "customer," and "person" may be used interchangeably herein.

In some implementations, the XR device and/or the server may support a deep learning accelerator (DLA). The DLA may be a hardware architecture designed and optimized for increased speed, efficiency, and accuracy when running deep learning algorithms, such as convolutional neural networks (CNNs), recurrent neural networks (RNNs), generative adversarial networks (GANs), and others. The DLA may enable inference tasks to be performed more rapidly and using less energy as compared to general-purpose computers.

In some implementations, the DLA may by supported/used for processing and learning with respect to various tasks. Such tasks, which are further described herein, may include determining a meal plan for the user of the XR device, determining a list of food items for preparing the target meals associated with the meal plan, identifying nutritional information associated with the food item, determining whether the food items are aligned with food preferences associated for the user, selecting a physical retail store based on the list of food items, determining additional target meals that are attainable using the food items included in the list of food items, and/or identifying additional food items that, when combined with certain food items included in the list of food items, make additional target meals.

As shown in FIG. 1A, and by reference number 102, the XR device may receive, via an interface of the XR device, an input associated with meals of a user associated with the XR device. The interface may be a voice interface. For example, the user may verbally indicate information associated with the meals. The interface may be a selection-based interface. For example, the XR device may receive, via the selection-based interface, the input based on hand movements of the user (e.g., hand motions and/or finger motions) or via hand controllers. The meals may be only for the user or the meals may be for the user and other persons (e.g., family members and/or friends).

In some implementations, the input may include a calorie requirement (e.g., 1500 calories per day, 2000 calories per day, or 2500 calories per day). The input may include a meal composition (e.g., 30% of calories from protein, 30% of calories from fat, and 40% of calories from carbohydrates). The input may include links to electronic pages describing potential target meals (e.g., blog pages with food recipes from a favorite food blogger). The input may include food preferences, where the food preferences may indicate food allergies (e.g., gluten), food sensitivities (e.g., dairy), foods to be avoided (e.g., animal protein), foods associated with an increased priority level (e.g., fruits and vegetables), certain food characteristics that are preferred (e.g., organic foods or non-genetically modified foods), and/or certain food characteristics that are not preferred (e.g., artificial sweeteners or dyes). The food preferences may indicate particular cuisines that are preferred or not preferred. The input may include an overall budget for purchasing the food items.

As shown by reference number 104, the XR device may determine, based on the input, a meal plan for the user of the XR device, where the meal plan may be associated with target meals. The XR device may determine the target meals from a plurality of potential target meals. The plurality of potential target meals may be categorized by type (e.g., appetizers, soups, salads, entrees, or desserts), number of calories, cuisine (e.g., Indian, Thai, or Italian), and various other factors. The XR device may evaluate, for a potential target meal, multiple recipes associated with the potential target meal, where each recipe may include a different combination of ingredients. The XR device may select one of the recipes based on the food preferences. For example, the XR device may identify multiple recipes for preparing carrot cake, where a first recipe for carrot cake may include eggs and a second recipe for carrot cake may not include eggs. When eggs conflict with the food preferences, the XR device may select the second recipe for preparing the carrot cake. Thus, the XR device may formulate the meal plan, where each target meal included in the meal plan may be aligned with the food preferences.

As shown by reference number 106, the XR device may determine, based on the recipes for the target meals, a list of food items for preparing the target meals associated with the meal plan. The food items may correspond to the ingredients needed for preparing the target meals. A food item may include one or more sub-ingredients (e.g., pre-made guacamole may include sub-ingredients of avocado, salt, and lemon). The XR device may compile food items from each of the target meals. The XR device may identify redundant food items (e.g., same food items that are used in multiple recipes). The XR device may aggregate quantities of food items associated with different target meals. For example, if a first target meal needs one cup of sugar and a second target meal needs a half cup of sugar, the XR device may form the list of food items to include sugar having a quantity of 1.5 cups.

In some implementations, the XR device may identify related food items from different target meals, and determine whether a same food item may be used for the different target meals. The XR device may consider an available quantity when determining whether the same food item may be used for the different target meals. For example, the XR device may identify that a first target meal uses sugar and a second target meal uses maple syrup. The XR device may determine that the maple syrup may be substituted with the sugar, and that a sufficient quantity of sugar exists for both the first target meal and the second target meal. In some implementations, the XR device may ignore certain food items (e.g., common ingredients, such as salt) from the list of food items because such food items are likely to already be possessed by the user. In some implementations, the XR device may ignore certain food items based on past food items that have previously been purchased. For example, the XR device may determine that a salt container was purchased a week ago and is likely to be still available for use.

In some implementations, the XR device may determine the list of food items based on the overall budget. When the food items on the list exceeds the overall budget, the XR device may attempt to identify substitute food items that are available at a lower price. The XR device may confirm that the substitute food items are aligned with the food preferences (e.g., no preservatives or artificial flavors).

In some implementations, when determining the target meals and the list of food items, the XR device may generate a directed graph. The directed graph may include a first set of nodes corresponding to the food items (or ingredients), a second set of nodes corresponding to the target meals, and a third set of nodes corresponding to intermediate steps between the food items and the target meals. The directed graph may indicate that a single food item may be associated with multiple target meals. In the directed graph, a root node may represent one of the target meals, and subsequent children may represent the food items. A node associated with a food item may be embedded with other information, such as price, calories, nutritional information, package quantity, and/or sub-ingredients (e.g., from the perspective of the manufacturer).

In some implementations, the XR device may detect, using a camera of the XR device, a recipe for a food item. For example, the user of the XR device may be reading a magazine that has the recipe, or the user may be reading an online blog that shows the recipe. The XR device may use object recognition, pattern recognition, optical character recognition (OCR), and other related techniques for detecting the recipe, and for reading ingredients associated with the recipe. The XR device may determine, based on behavioral factors of the user (e.g., an amount of time spent reading the recipe, facial reactions of the user, or speech spoken by the user), that the recipe is suitable to be used for one of the target meals. The XR device may determine the meal plan with the target meals and the list of food items based on the detected recipe of the food item. Alternatively, the XR device may determine that the recipe is not suitable based on the food preferences, and the XR device may provide a warning, via the interface, that the recipe may not be compatible with the food preferences.

As shown by reference number 108, the XR device may select, using store information, the physical retail store based on the list of food items. The store information may indicate a plurality of physical retail stores and real-time item inventory information for each of the plurality of physical retail stores. The XR device may identify the physical retail store (or multiple physical retail stores) that carry the food items on the list. The XR device may attempt to minimize a number of physical retail stores for the user to visit. The XR device may select the physical retail store based on a base location associated with the user and a maximum distance the user is willing to travel (e.g., 5 miles), a cost budget, past physical retail stores visited by the user, and/or user reviews of physical retail stores. The user reviews may be from the user or from other users. The XR device may select the physical retail stores based on the real-time item inventory information. The XR device may determine, for a certain food item, whether that food item at a particular physical retail store is available or whether there is currently no inventory of that food item at the particular physical retail store. In some implementations, the XR device may select the physical retail store based on an availability of inventory data and inventory location, such that the XR device is able to determine a route for the user to take in the physical retail store.

As shown in FIG. 1B, and by reference number 110, the XR device may provide, via the interface, store information, the list of food items, and the target meals. The store information may include a name of the physical retail store, store hours, and/or a store address. The list of food items and the target meals may be aligned with the food preferences. The interface may provide an option to select a particular target meal to view food items associated with that target meal. The interface may provide an option for the user to accept or reject any one of the target meals and/or the food items on the list. When a particular target meal is rejected via the interface, food items associated with that target meal may be removed from the list of food items. When the same food item is used for multiple target meals, the food item may not be removed from the list of food items, but a required quantity of the food item may be adjusted to account for the removal of one of the target meals. When a particular food item is rejected via the interface, a substitute food item may be recommended. The interface may present an option to accept the substitute food item.

As an example, the XR device may display, via the interface, target meals associated with cookies and a pie. The food items to be used for the cookies may include flour, butter, sugar, and eggs. The food items to be used for the pie may include butter, sugar, a pie crust, and apples. In this example, butter and sugar may be used to prepare both the cookies and the pie.

In some implementations, the interface may provide interface controls, which may allow the user to modify food preferences on-the-fly, and then view updated target meals and/or food items. For example, the interface controls may include a slider control, which may allow the user to adjust a calorie requirement, healthiness parameters, food budget, etc., and the XR device may provide, via the interface, the updated target meals and/or food items. As a result, the user may experiment with different settings until the target meals and/or food items which are presented are satisfactory to the user.

In some implementations, the XR device, and the user associated with the XR device, may travel to the physical retail store. The XR device may detect that the XR device is within the physical retail store based on a geographic location associated with the XR device. The XR device may determine the geographic location, and compare the geographic location to the address indicated in the store information. Based on the comparison, the XR device may determine the physical retail store in which the XR is located. Alternatively, the XR device may receive, via the interface, an indication of the physical retail store in which the XR device is located.

In some implementations, the XR device may provide, via the interface, user-preference-based marketing for food item companies. For example, if the user is looking for vegan mayo, a certain mayo company may pay to indicate a listing of that mayo company's may product first among multiple mayo products. In some implementations, food items suggested to the user may be based on the user's preference (e.g., lowest cost, most liked, and/or most reviews).

As shown in FIG. 1C, and by reference number 112, the XR device may retrieve, from the server, store mapping information associated with the physical retail store. The store mapping information may indicate a map of store aisles and corresponding food items that are available for sale in the store aisles. The map may indicate, for a particular aisle, shelf numbers associated with that particular aisle. A given shelf number may hold certain food items. The XR device may receive the store mapping information prior to arriving at the physical retail store, or after the XR device arrives at the physical retail store.

As shown by reference number 114, the XR device may determine, using a camera of the XR device, a current location within the physical retail store. The current location may be associated with the XR device and/or the user wearing (or carrying) the XR device. The XR device, based on object recognition or other related techniques employed by the camera, may determine that the user is in a particular area of the physical retail store (e.g., an entryway or a particular aisle). The XR device may detect an entryway sign, aisle sign numbers, etc. using object recognition, which may enable the XR device to determine the current location within the physical retail store.

As shown by reference number 116, the XR device may determine a next food item to be purchased from the list of food items. The next food item may be a first food item on the list of food items to be purchased at the physical retail store. In some implementations, the XR device may determine, based on the store mapping information, a next location associated with the next food item. The next location may be a specific aisle or a general area of the physical retail store (e.g., a bakery area, a produce area, or an apparel area).

As shown by reference number 118, the XR device may provide, via the interface, an in-store navigation path to direct the user via overlayed audio-visual cues to the next location at which the next food item is held. The overlayed audio-visual cues may direct the user from the current location to the next location associated with the next food item. The overlayed audio-visual cues may include audio commands (e.g., walk to aisle 3 to purchase sugar) to direct the user. The overlayed audio-visual cues may include visual directional signs (e.g., turn right or turn left) to direct the user. The overlayed audio-visual cues may be presented via a speaker of the XR device and/or a display of the XR device.

In some implementations, the XR device may communicate with store shelves to help the user find a desired food item. For example, based on a user location, an indicator (e.g., an LED) on a shelf containing a desired food item may illuminate to help the user quickly identify a desired food item.

In some implementations, the XR device may detect, via a camera of the XR device, that the next food item has been added to a shopping cart (e.g., the user physically places the next food item into the shopping cart). The camera may use object recognition, image recognition, or other related techniques, such that when the user picks up the next food item, the camera may scan the next food item and determine that the next food item corresponds to one of the food items from the list. After the next food item is added, the XR device may direct the user to another location within the physical retail store. The other location may be associated with another food item, which may be based on the XR device determining that there are remaining food items from the list. Alternatively, the other location may be a checkout location in the physical retail store, which may be based on the XR device determining that all food items on the list have been added to the shopping cart.

In some implementations, the XR device may provide, via the interface, the in-store navigation path to direct the user via the overlayed audio-visual cues to locations within the physical retail store at which the food items are held. The-store navigation path may be mapped for the user with food items on the list tagged or highlighted at appropriate locations (e.g., aisles or rows) in the physical retail store. The XR device may generate the in-store navigation path based on the store mapping information and the food items to be purchased. The XR device may provide the overlayed audio-visual cues after the user enters the physical retail store. The XR device may identify a location (e.g., an aisle number and/or shelf number) associated with each food item to be purchased. The XR device may determine the in-store navigation path based on the identified locations. In some implementations, the XR device may generate the in-store navigation path, such that the user only walks through aisles in which needed food items are located. In this case, the in-store navigation path may be the shortest path for visiting the locations within the physical retail store at which the food items are held. In some implementations, the XR device may generate an in-store navigation path that directs the user to other aisles within the physical retail store, where the other aisles may contain other food items that may be of interest to the user. The XR device may determine the other food items based on the food preferences. Whether the XR device provides the shortest in-store navigation path or a non-shortest in-store navigation path may depend on user preference information.

As an example, based on a list of six food items (e.g., flour, butter, sugar, eggs, a pie crust, and apples) to be purchased, the server may generate an in-store navigation path that directs the user to a first aisle to pick up a first food item. The in-store navigation path may direct the user to a second aisle to pick up a second food item, a third food item, and a fourth food item. The in-store navigation path may direct the user to a third aisle to pick up a fifth food item and a sixth food item. In this example, the server may generate the in-store navigation path such that the user only walks in parts of aisles in which needed food items are located, and the user is not directed to walk in other aisles of the physical retail store.

As indicated above, FIG. 1 is provided as an example. Other examples may differ from what is described with regard to FIG. 1.

Figure 2:
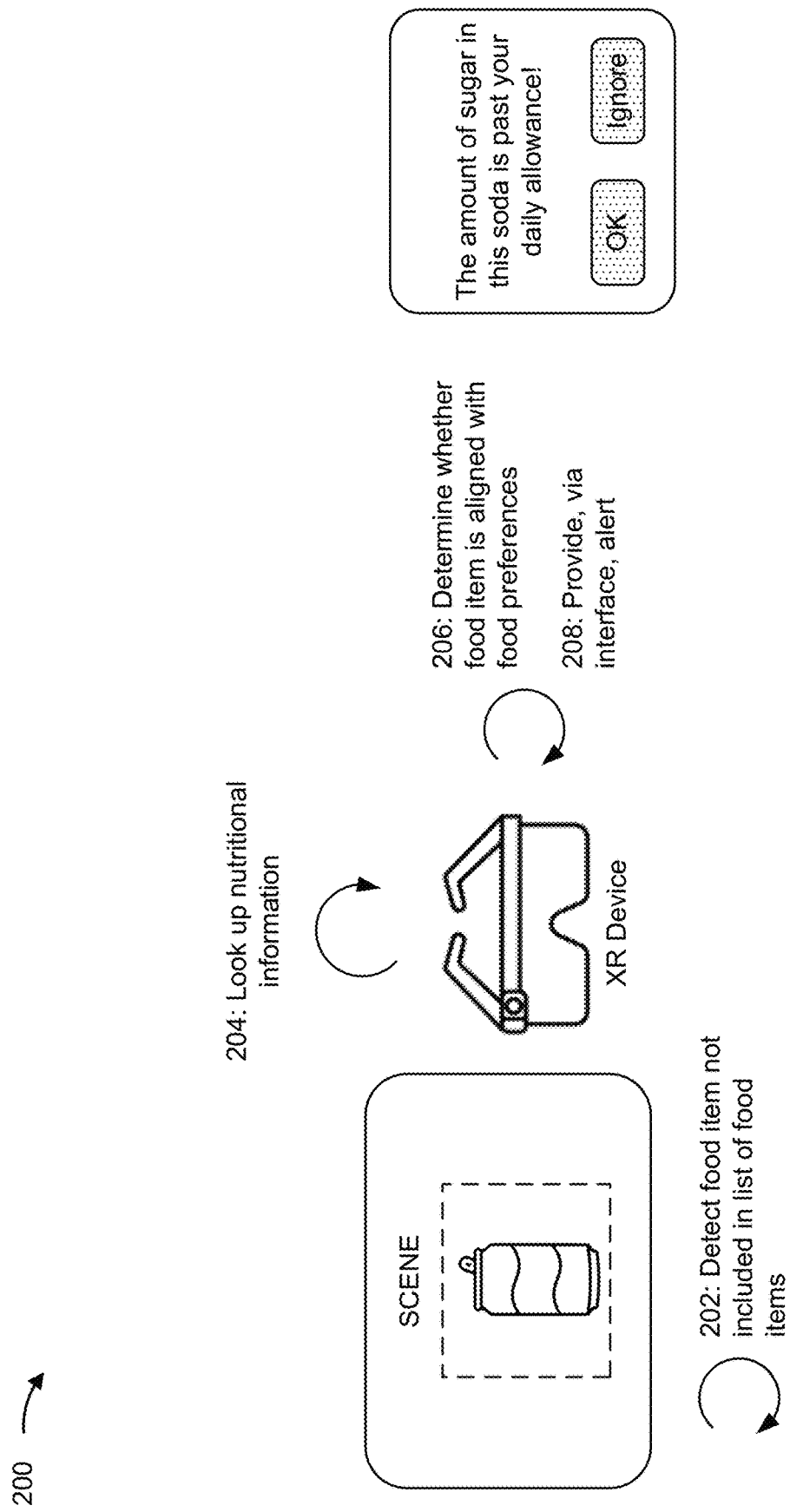
FIGS. 2, 3A, 3B, and 4 are diagrams of examples related to detecting food items associated with target meals by an extended reality (XR) device.

FIG. 2 is a diagram of an example 200 related to detecting food items associated with target meals by an XR device. As shown in FIG. 2, example 200 includes the XR device. This device is described in more detail in connection with FIGS. 8 and 9.

As shown by reference number 202, the XR device may detect, using a camera of the XR device, a food item (e.g., soda) in a field of view of the camera. For example, a user of the XR device may hold the food item in front of the camera. The user may not necessarily add the food item to a shopping cart, but the user may hold the food item up to look at the food item. The camera may use object recognition, image recognition, or other related techniques to identify the food item. The XR device may determine that the food item is not included in a list of food items to be purchased. As shown by reference number 204, the XR device may look up nutritional information associated with the food item. The XR device may access a database of nutritional information for a plurality of food items. The nutritional information may indicate, for the food item, various types of information, such as calorie information, ingredients, vitamin information, etc. As shown by reference number 206, the XR device may determine, based on the nutritional information, whether the food item is aligned with food preferences defined for the user. The XR device may check the food preferences against the nutritional information. As shown by reference number 208, the XR device may provide, via the interface, an alert indicating that the food item does not align with the set of food preferences. The alert may indicate a reasoning associated with the alert (e.g., too much sugar). As a result, the user may be prevented from making unhealthy food choices or exceeding a budget.

As indicated above, FIG. 2 is provided as an example. Other examples may differ from what is described with regard to FIG. 2.

Figure 3A:
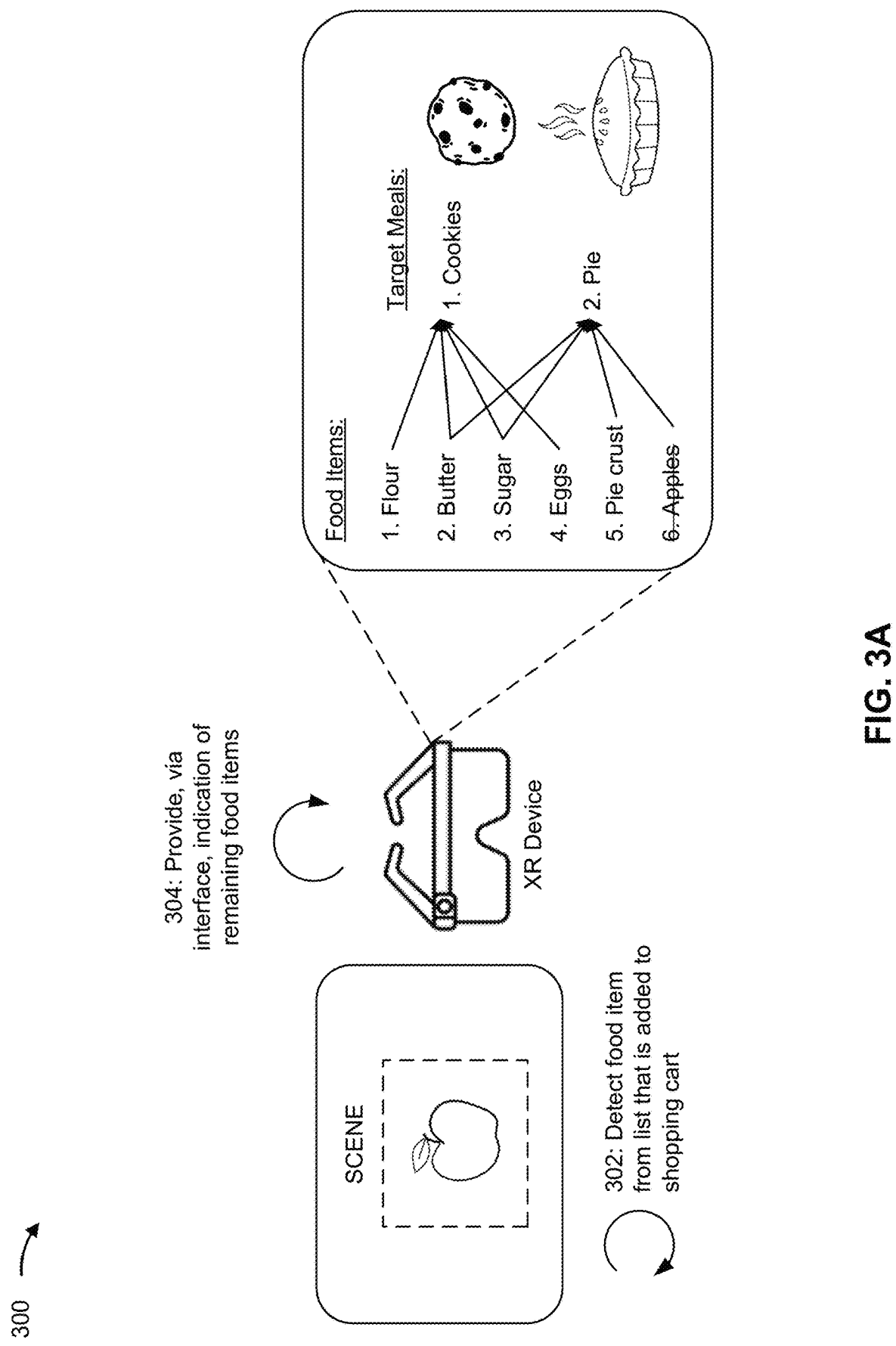
Figure 3B:
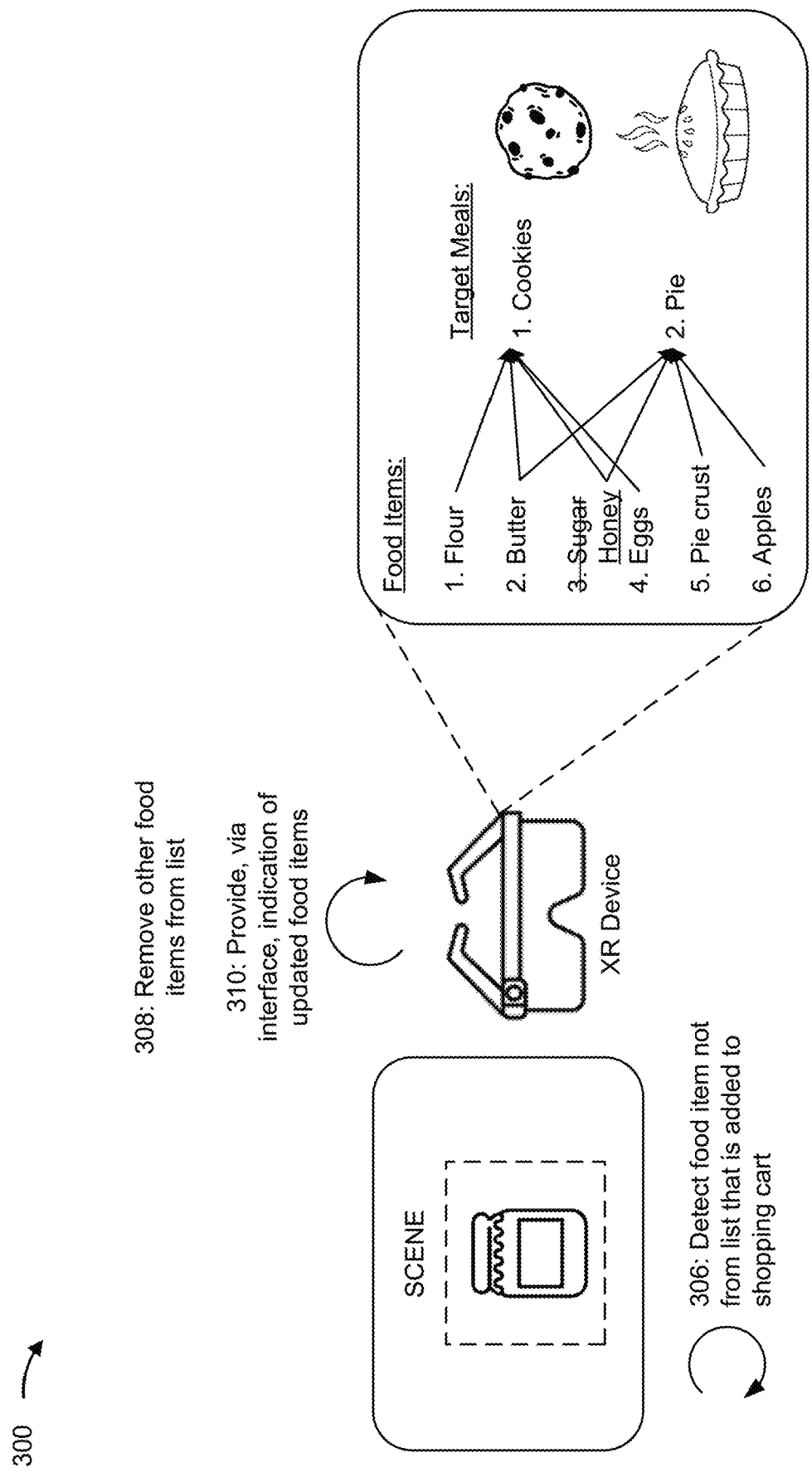

FIGS. 3A-3B are diagrams of examples 300 related to detecting food items associated with target meals by an XR device. As shown in FIGS. 3A-3B, examples 300 include the XR device. This device is described in more detail in connection with FIGS. 8 and 9.

As shown in FIG. 3A, and by reference number 302, the XR device may detect, using a camera of the XR device, a food item (e.g., apples) added to a shopping cart. The camera may use object recognition or other related techniques to identify the food item that is added to the shopping cart. The food item may be included in a list of food items to be purchased. As shown by reference number 304, the XR device may provide, via an interface, an indication of remaining food items. For example, the interface may indicate that apples from the list have been added to the shopping cart.

As shown in FIG. 3B, and by reference number 306, the XR device may detect, using the camera, a food item (e.g., honey) added to the shopping cart. The food item may not be included in the list of food items to be purchased. As shown by reference number 308, the XR device may remove other food items from the list of food items based on the food item that is added to the shopping cart. For example, the XR device may remove sugar from the list of food items based on a determination that the sugar may be substituted with honey. As shown by reference number 310, the XR device may provide, via the interface, an indication of updated food items. For example, the interface may indicate that sugar has been substituted by honey, which may be based on the user's action of adding the honey to the shopping cart.

In some implementations, the XR device may form a directed graph, which may include a first set of nodes that represent food items, a second set of nodes that represent target meals, and a third set of nodes that represent intermediate steps between the food items and the target meals. When a food item or a target meal is added or removed (e.g., based on a user input), the XR device may update the directed graph to obtain an updated directed graph. The updated directed graph may include different nodes for the food items and/or the target meals depending on the modifications made to the food items and/or the target meals. For example, the XR device may determine the updated directed graph based on a food item being added that was not originally on the list of food items to be purchased. The XR device may determine the updated directed graph based on a runtime graph optimization.

As an example, a list of food items may include avocados, salt, limes, and onions, which may be used to make a target meal of guacamole. However, the user of the XR device may add pre-made guacamole to the shopping cart, which may negate the need to purchase the avocados, the salt, the limes, and/or the onions, unless some of these food items are needed to prepare other target meals. For example, the salt and the limes may be left on the list, but the avocados and the onions may be removed from the list.

As indicated above, FIG. 3 is provided as an example. Other examples may differ from what is described with regard to FIG. 3.

Figure 4:
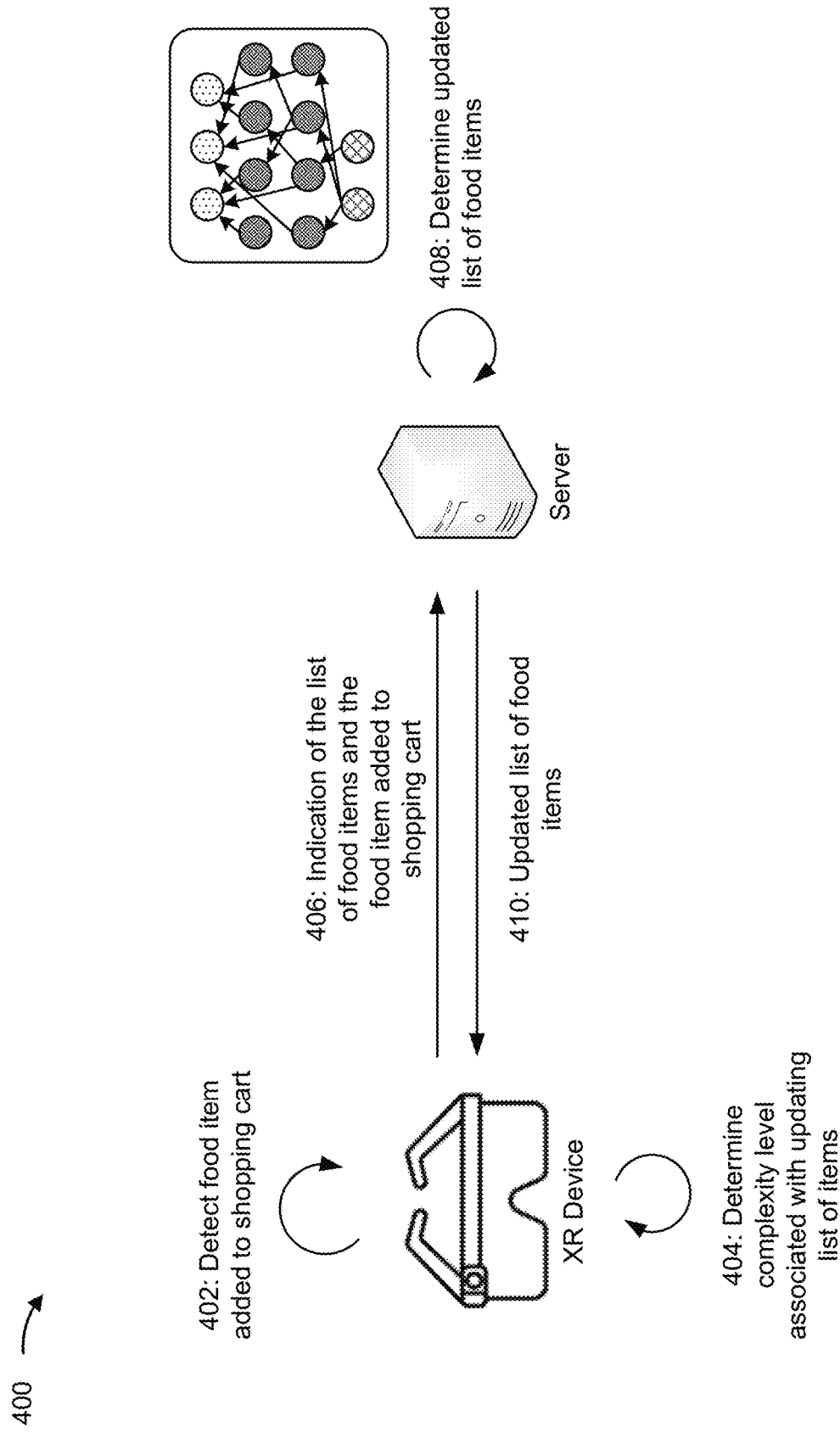

FIG. 4 is a diagram of an example 400 related to detecting food items associated with target meals by an XR device. As shown in FIG. 4, example 400 includes the XR device and a server. These devices are described in more detail in connection with FIGS. 8 and 9.

As shown by reference number 402, the XR device may detect, using a camera of the XR device, a food item added to a shopping cart. The food item may not be included in a list of food items to be purchased. As shown by reference number 404, the XR device may determine a complexity level associated with updating the list of food items based on the food item added to the shopping cart. The XR device may determine that the complexity level satisfies a threshold. For example, the XR device may determine that updating the list of food items involves modifying a certain number of nodes and/or edges in a directed graph, which may cause the complexity level to satisfy the threshold. As shown by reference number 406, the XR device may transmit, to the server, an indication of the list of food items and the food item added to the shopping cart based on the complexity level satisfying the threshold. As shown by reference number 408, the server may determine an updated list of food items, which may be based on a higher compute capability of the server as compared to the XR device. The server may determine an updated directed graph, which may reflect the updated list of food items. As shown by reference number 410, the server may transmit, to the XR device, the updated list of food items. As a result, the XR device may offload certain computations to the server rather than performing the computations locally.

As indicated above, FIG. 4 is provided as an example. Other examples may differ from what is described with regard to FIG. 4.

Figure 5:
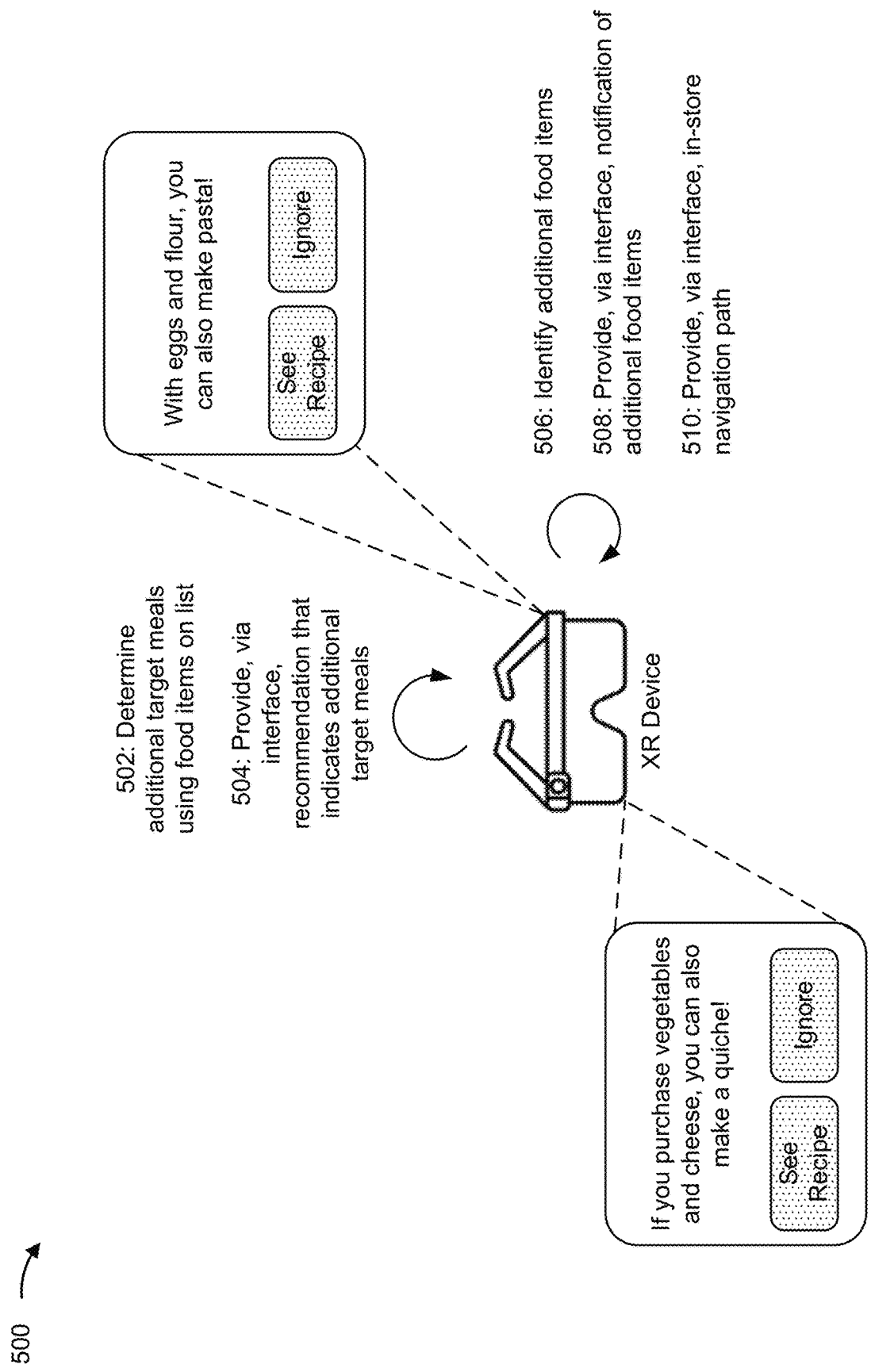
FIG. 5 is a diagram of an example related to providing indications associated with food items.

FIG. 5 is a diagram of an example 500 related to providing indications associated with food items. As shown in FIG. 5, example 500 includes an XR device. This device is described in more detail in connection with FIGS. 8 and 9.

As shown by reference number 502, the XR device may determine additional target meals that are attainable using food items included in a list of food items. The XR device may determine the additional target meals using existing food items. The XR device may ensure that quantities of the existing food items are sufficient for preparing the additional target meals. The XR device may determine the additional target meals from a plurality of potential target meals. The additional target meals may be aligned with food preferences. In other words, the XR device may ensure that the additional target meals do not conflict with any of the food preferences. For example, the additional target meals may be aligned with cuisines liked by a user of the XR device, a calorie requirement, food restrictions, etc.

As shown by reference number 504, the XR device may provide, via an interface, a recommendation that indicates the additional target meals. As a result, the user may be presented with useful information regarding additional target meals that may be prepared using the existing food items.

As an example, the XR device may determine that a sufficient quantity of flour and eggs are available for preparing pasta. The XR device may determine that pasta is aligned with the user's interest in Italian food. The XR device may provide, via the interface, a recommendation for the user to prepare pasta using the remaining flour and eggs. The user may indicate, via the interface, whether the user is interested in learning more about preparing pasta, in which case the user may be presented with a pasta recipe. Alternatively, the user may indicate, via the interface, that preparing pasta is not of interest to the user.

As shown by reference number 506, the XR device may identify additional food items that, when combined with certain food items included in the list of food items, may make additional target meals. In other words, the XR device may determine existing food items on the list of food items, and the XR device may determine additional food items that could be added to the existing food items to create new target meals. The XR may attempt to limit the number of additional food items and to use existing food items. As shown by reference number 508, the XR device may provide, via the interface, a notification of the additional food items, where the notification may include an option to accept the additional food items. As shown by reference number 510, the XR device may provide, via the interface, an in-store navigation path to direct the user of the XR device via overlayed audio-visual cues to additional locations within a physical retail store to pick up the additional food items. When the user of the XR device is at the physical retail store, the user may be presented with the additional food items and the additional target meals, and if the user is interested, the XR device may direct the user to the additional locations to pick up the additional food items.

As an example, the XR device may determine that the user is already purchasing butter, eggs, and a pie crust. The XR device may determine that adding vegetables and cheese to the butter, eggs, and the pie crust may enable a quiche to be made. The XR device may determine that a quiche is aligned with the user's food preferences. The XR device may provide, via the interface, a notification that, by adding vegetables and cheese, the user may be able to prepare a quiche. The user may view the notification while at the physical retail store, and if interested, the user may be directed via the overlayed audio-visual cues to appropriate aisles to pick up the vegetables and the cheese.

As indicated above, FIG. 5 is provided as an example. Other examples may differ from what is described with regard to FIG. 5.

Figure 6:
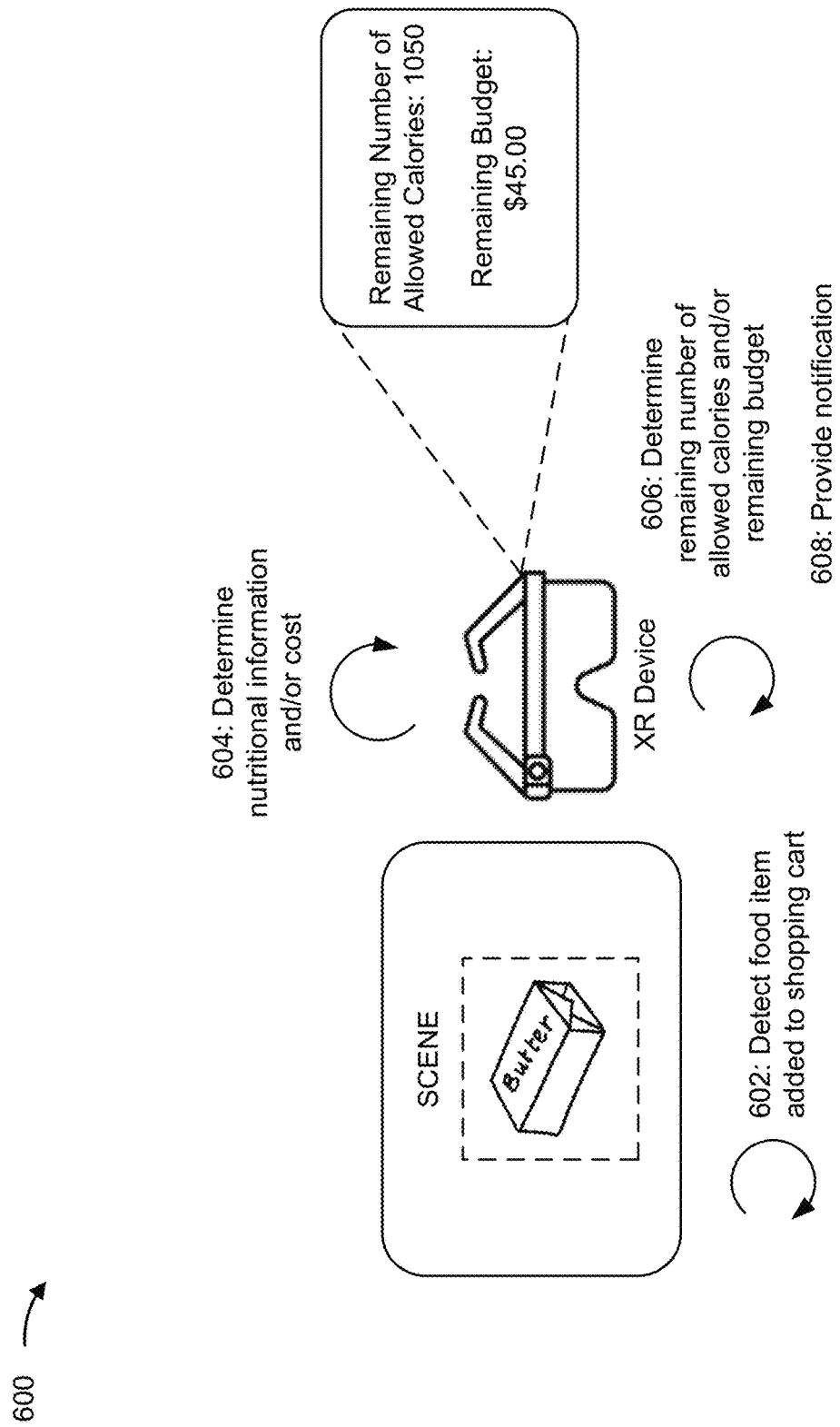
FIG. 6 is a diagram of an example related to detecting food items associated with target meals by an XR device.

FIG. 6 is a diagram of an example 600 related to detecting food items associated with target meals by an XR device. As shown in FIG. 6, example 600 includes the XR device. This device is described in more detail in connection with FIGS. 8 and 9.

As shown by reference number 602, the XR device may detect, using a camera of the XR device, a food item (e.g., butter) added to a shopping cart. As shown by reference number 604, the XR device may look up nutritional information associated with the food item. Additionally, or alternatively, the XR device may detect, using the camera, a cost associated with the food item. For example, the XR device may use character recognition or related techniques to read a price tag associated with the food item. As another example, the XR device may read a barcode associated with the food item, obtain an item number associated with the barcode, and look up the item number in a database of item numbers and corresponding costs. As shown by reference number 606, the XR device may determine a remaining number of allowed calories based on the nutritional information associated with the food item and a calorie requirement, which may be previously defined by a user of the XR device. Additionally, or alternatively, the XR device may determine a remaining budget based on the cost associated with the food item and a budget requirement, which may be previously defined by the user of the XR device. As shown by reference number 608, the XR device may provide, via an interface, a notification of the remaining number of allowed calories and/or the remaining budget. As a result, as the user adds additional food items to the shopping cart, the user may be presented with near real-time information regarding the food items in the shopping cart, which may influence subsequent shopping decisions by the user.

As indicated above, FIG. 6 is provided as an example. Other examples may differ from what is described with regard to FIG. 6.

Figure 7A:
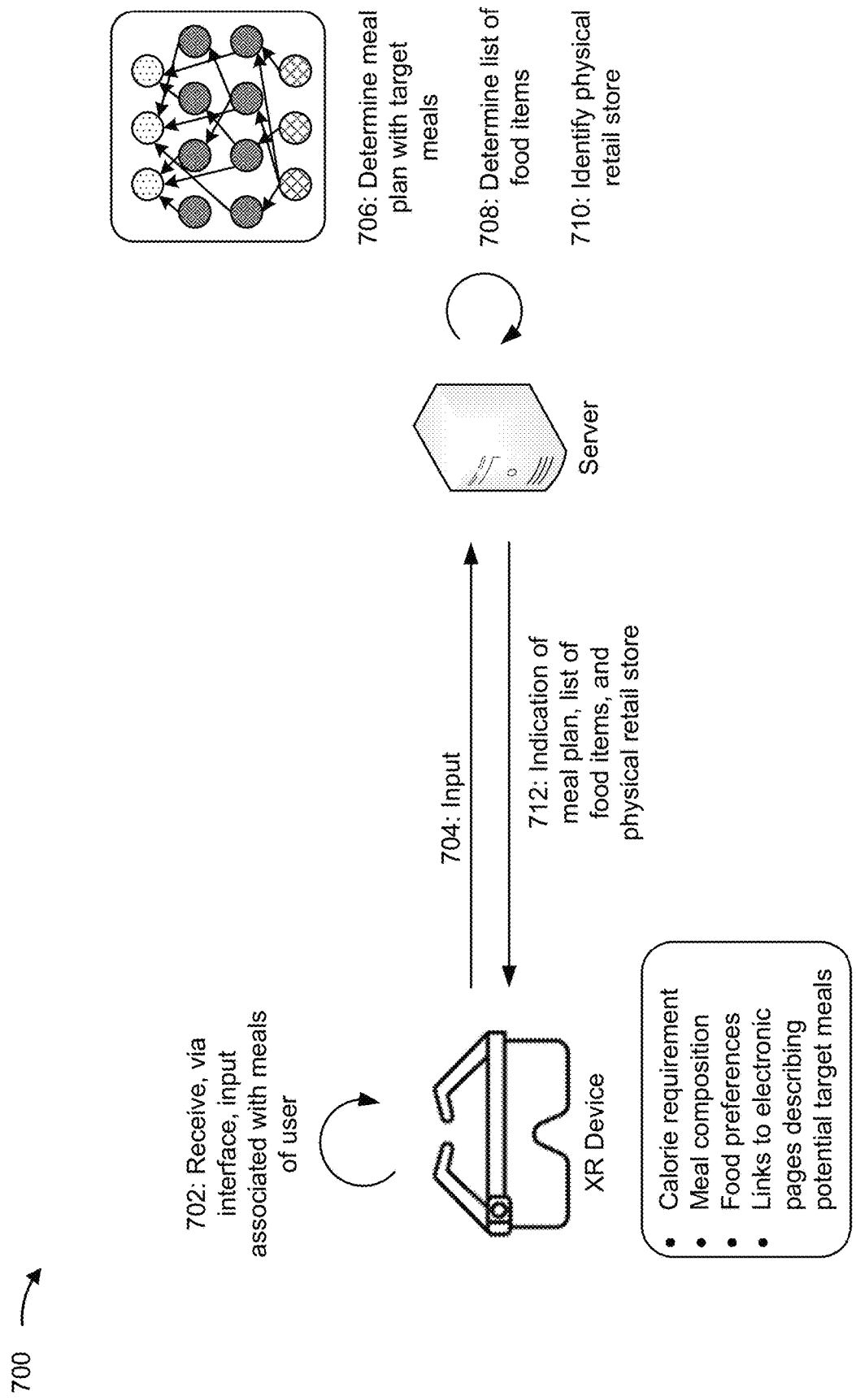
FIGS. 7A-7B are diagrams of examples related to detecting food items associated with target meals by a server.
Figure 7B:
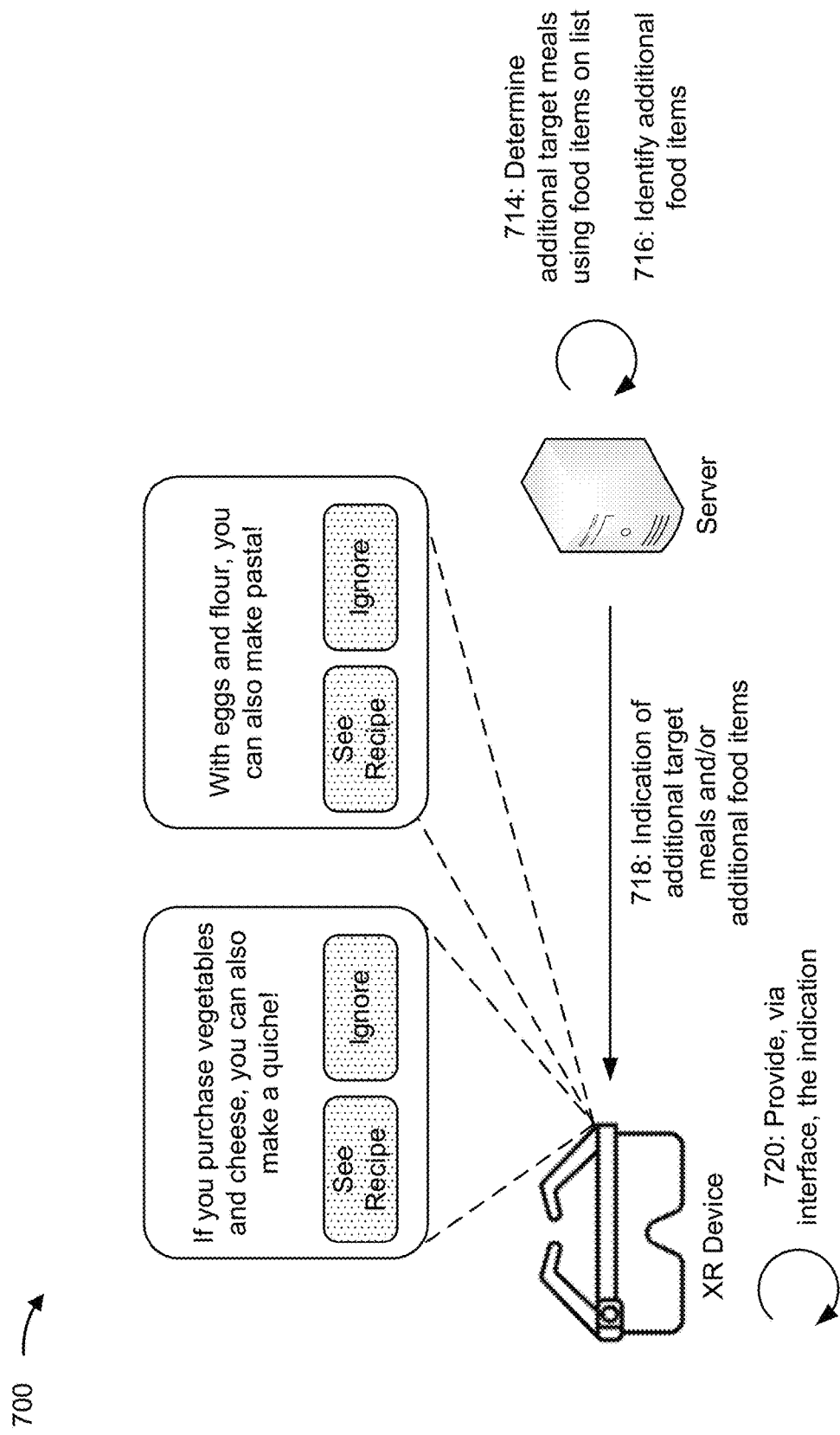

FIGS. 7A-7B are diagrams of examples 700 related to detecting food items associated with target meals by a server. As shown in FIGS. 7A-7B, examples 700 include an XR device and the server. These devices are described in more detail in connection with FIGS. 8 and 9.

As shown in FIG. 7A, and by reference number 702, the XR device may receive, via an interface, an input associated with meals of a user associated with the XR device. The input may include a calorie requirement, a meal composition, food preferences, and/or links to electronic pages describing potential target meals. As shown by reference number 704, the XR device may transmit the input to a server. The server may receive the input from the XR device. As shown by reference number 706, the server may determine, based on the input, a meal plan for the user of the XR device, where the meal plan may be associated with target meals. As shown by reference number 708, the server may determine, based on recipes for the target meals, a list of food items for preparing the target meals associated with the meal plan. As shown by reference number 710, the server may identify a physical retail store that carries the food items on the list.

As shown by reference number 712, the server may transmit, to the XR device, an indication of the meal plan that includes the target meals, the list of food items, and the physical retail store that carries the food items. The XR device may provide, via an interface of the XR device, the indication for display to the user.

As shown in FIG. 7B, and by reference number 714, the server may determine additional target meals using food items on the list. As shown by reference number 716, the server may identify additional food items, which may be combined with existing food items to make additional target meals. As shown by reference number 718, the server may transmit, to the XR device, an indication of the additional target meals and/or the additional food items. As shown by reference number 720, the XR device may provide, via the interface, the indication for display to the user.

In some implementations, certain processing-heavy tasks, such as determining a meal plan that includes target meals, determining lists of food items, selecting physical retail stores, determining additional target meals, and/or identifying additional food items may be offloaded from the XR device to the server. In other words, such tasks may not be suitable to run on the XR device (e.g., due to high battery consumption), and instead these tasks may be given to the server.

As indicated above, FIG. 7 is provided as an example. Other examples may differ from what is described with regard to FIG. 7.

Figure 8:
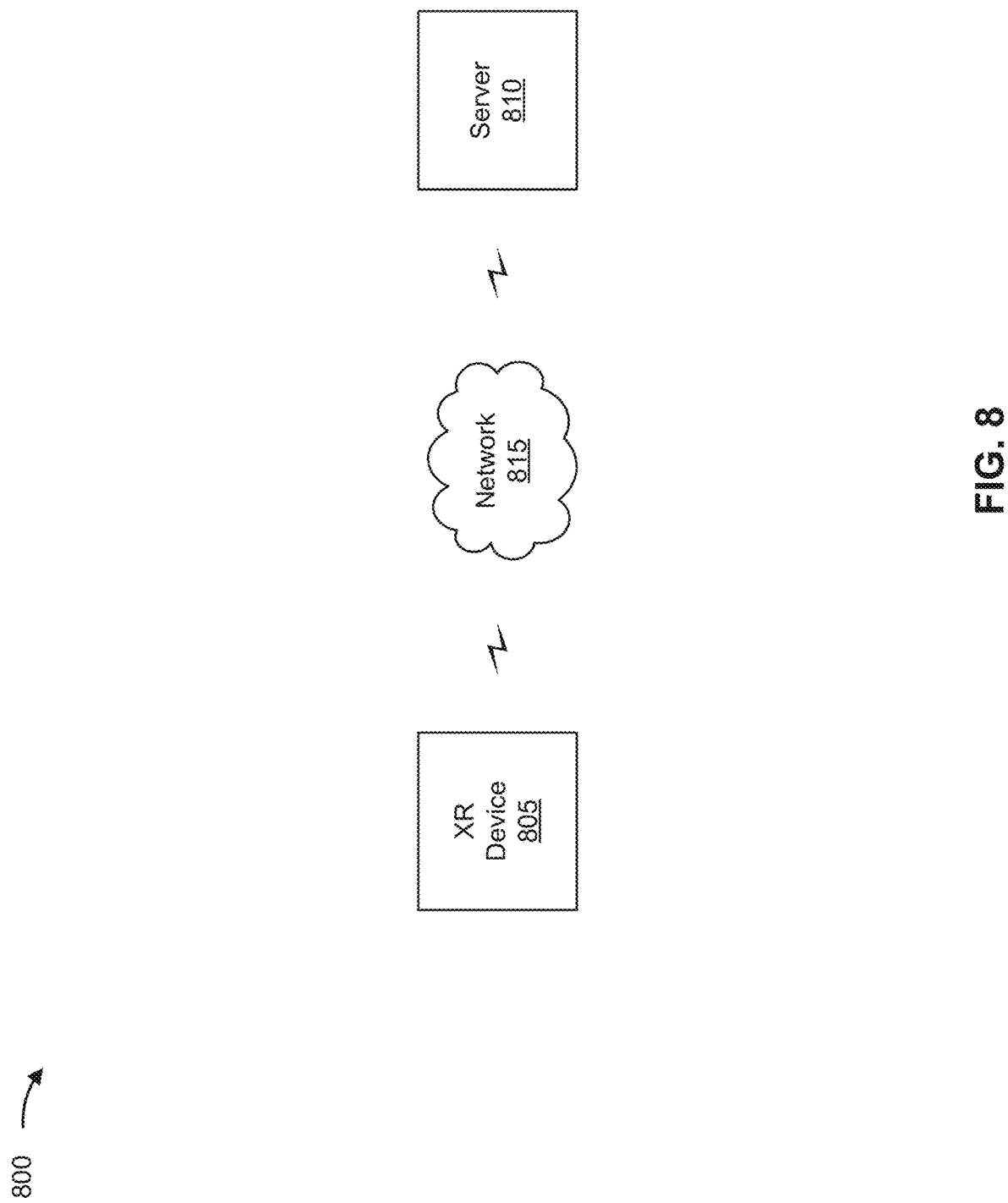
FIG. 8 is a diagram illustrating an example environment in which systems and/or methods described herein may be implemented.

FIG. 8 is a diagram of an example environment 800 in which systems and/or methods described herein may be implemented. As shown in FIG. 8, environment 800 may include XR devices 805, a server 810, and a network 815. Devices of environment 800 may interconnect via wired connections, wireless connections, or a combination of wired and wireless connections.

An XR device 805 may be capable of receiving, generating, storing, processing, providing, and/or routing information associated with providing navigation paths for directing users to food items based on a meal plan, as described elsewhere herein. The XR device 805 may be a head-mounted device (or headset) or a mobile device. The XR device 805 may provide XR capabilities, which may include AR, MR, and/or VR. The XR device 805 may include various types of hardware, such as processors, sensors, cameras, input devices, and/or displays. The sensors may include accelerometers, gyroscopes, magnetometers, and/or eye-tracking sensors. The XR device 805 may include an optical head-mounted display, which may allow information to be superimposed onto a field of view.

The server 810 includes one or more devices capable of receiving, generating, storing, processing, providing, and/or routing information associated with providing navigation paths for directing users to food items based on a meal plan, as described elsewhere herein. The server 810 may include a communication device and/or a computing device. For example, the server 810 may be an application server, a client server, a web server, a database server, a host server, a proxy server, a virtual server (e.g., executing on computing hardware), or a server in a cloud computing system. In some implementations, the server 810 includes computing hardware used in a cloud computing environment.

The network 815 includes one or more wired and/or wireless networks. For example, the network 815 may include a cellular network, a public land mobile network, a local area network, a wide area network, a metropolitan area network, a telephone network, a private network, the Internet, and/or a combination of these or other types of networks. The network 815 enables communication among the devices of environment 800.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
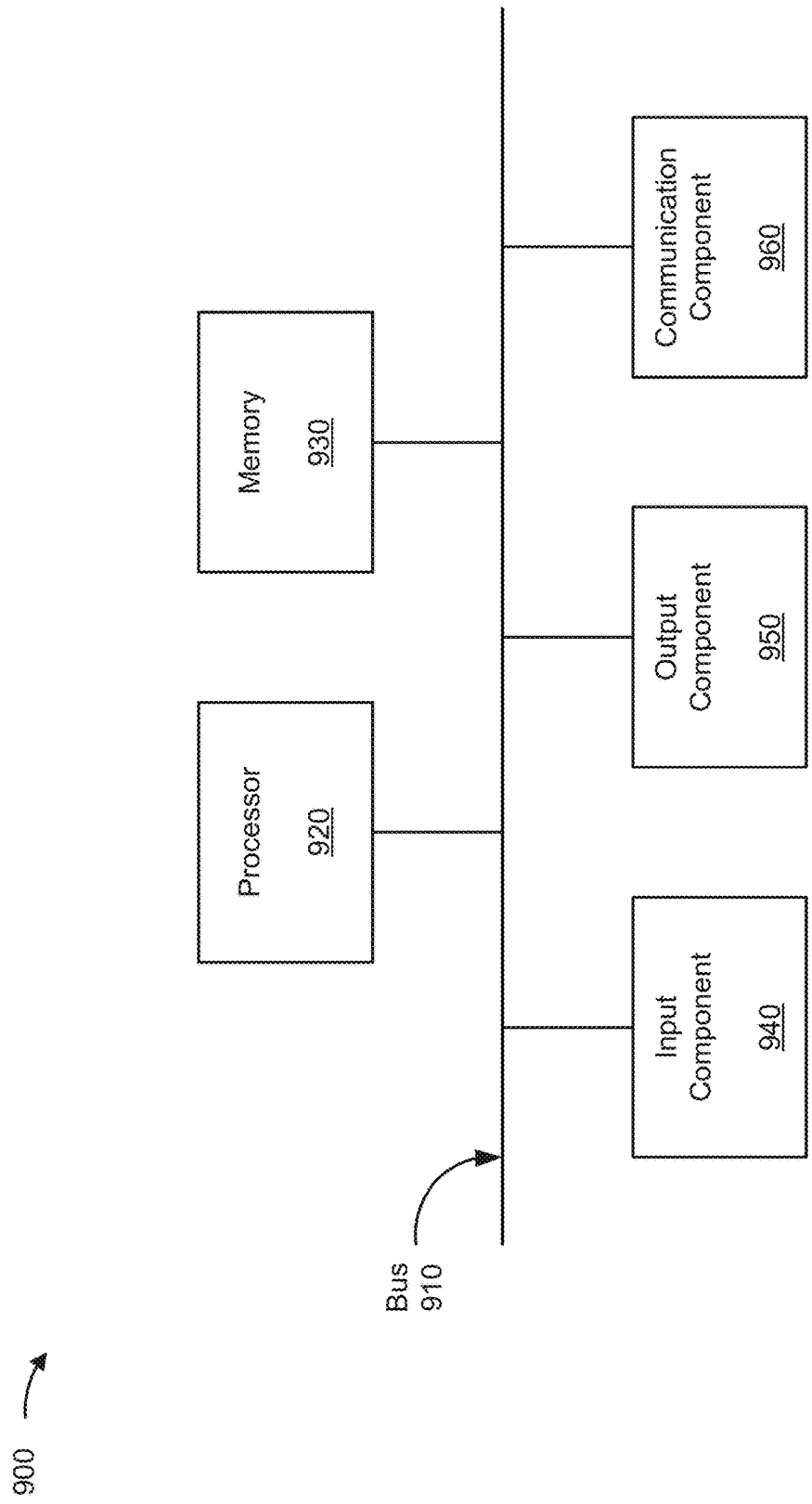
FIG. 9 is a diagram of example components of one or more devices of FIG. 8.

FIG. 9 is a diagram of example components of a device 900 associated with providing navigation paths for directing users to food items based on a meal plan. Device 900 may correspond to XR device 805 and/or server 810. In some implementations, XR device 805 and/or server 810 may include one or more devices 900 and/or one or more components of device 900. As shown in FIG. 9, device 900 may include a bus 910, a processor 920, a memory 930, an input component 940, an output component 950, and a communication component 960.

Bus 910 may include one or more components that enable wired and/or wireless communication among the components of device 900. Bus 910 may couple together two or more components of FIG. 9, such as via operative coupling, communicative coupling, electronic coupling, and/or electric coupling. Processor 920 may include a central processing unit, a graphics processing unit, a microprocessor, a controller, a microcontroller, a digital signal processor, a field-programmable gate array, an application-specific integrated circuit, and/or another type of processing component. Processor 920 is implemented in hardware, firmware, or a combination of hardware and software. In some implementations, processor 920 may include one or more processors capable of being programmed to perform one or more operations or processes described elsewhere herein.

Memory 930 may include volatile and/or nonvolatile memory. For example, memory 930 may include random access memory (RAM), read only memory (ROM), a hard disk drive, and/or another type of memory (e.g., a flash memory, a magnetic memory, and/or an optical memory). Memory 930 may include internal memory (e.g., RAM, ROM, or a hard disk drive) and/or removable memory (e.g., removable via a universal serial bus connection). Memory 930 may be a non-transitory computer-readable medium. Memory 930 stores information, instructions, and/or software (e.g., one or more software applications) related to the operation of device 900. In some implementations, memory 930 may include one or more memories that are coupled to one or more processors (e.g., processor 920), such as via bus 910.

Input component 940 enables device 900 to receive input, such as user input and/or sensed input. For example, input component 940 may include a touch screen, a keyboard, a keypad, a mouse, a button, a microphone, a switch, a sensor, a global positioning system sensor, an accelerometer, a gyroscope, and/or an actuator. Output component 950 enables device 900 to provide output, such as via a display, a speaker, and/or a light-emitting diode. Communication component 960 enables device 900 to communicate with other devices via a wired connection and/or a wireless connection. For example, communication component 960 may include a receiver, a transmitter, a transceiver, a modem, a network interface card, and/or an antenna.

Device 900 may perform one or more operations or processes described herein. For example, a non-transitory computer-readable medium (e.g., memory 930) may store a set of instructions (e.g., one or more instructions or code) for execution by processor 920. Processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry is used instead of or in combination with the instructions to perform one or more operations or processes described herein. Additionally, or alternatively, processor 920 may be configured to perform one or more operations or processes described herein. Thus, implementations described herein are not limited to any specific combination of hardware circuitry and software.

The number and arrangement of components shown in FIG. 9 are provided as an example. Device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
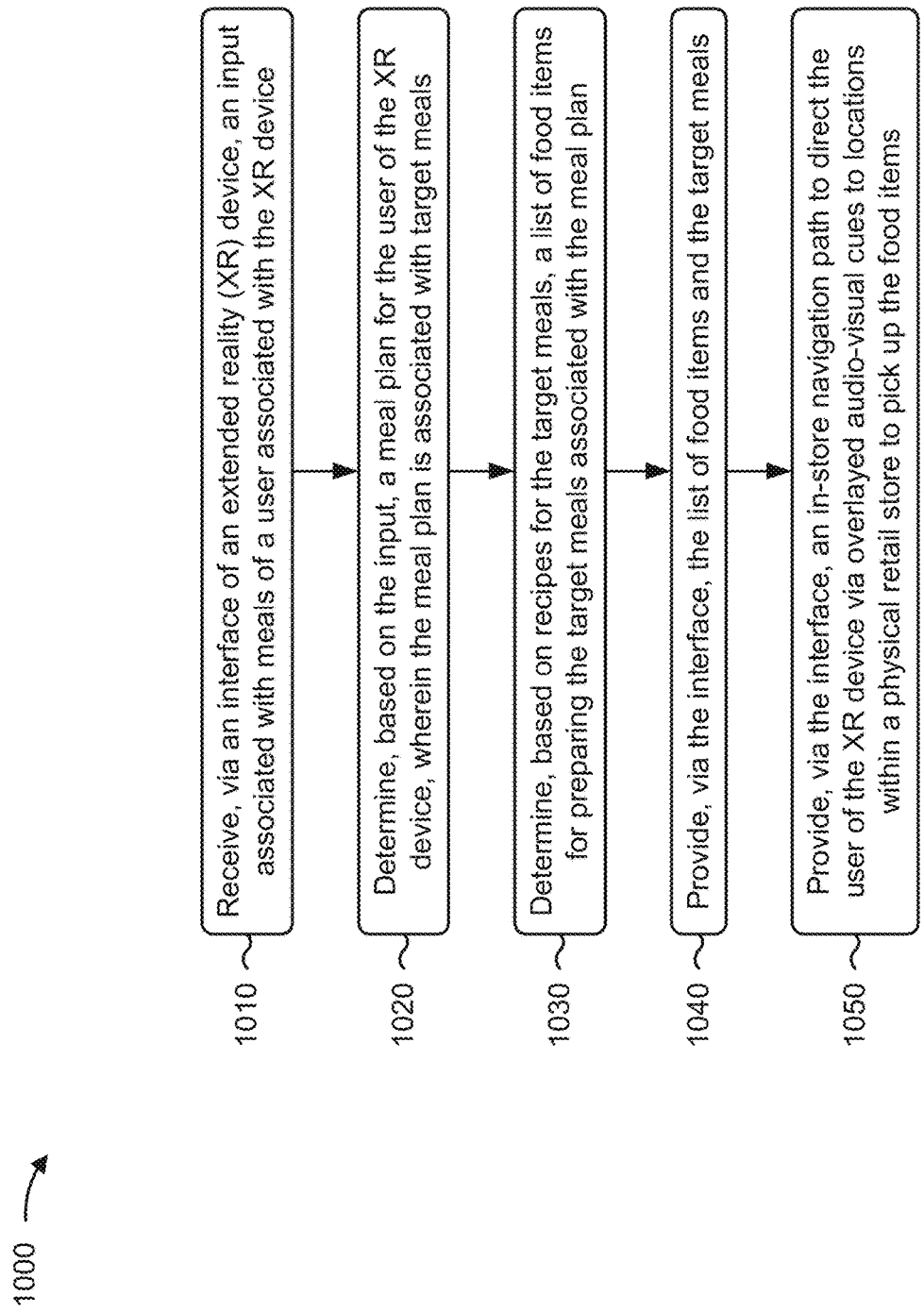
FIGS. 10-11 are flowcharts of example processes relating to providing navigation paths for directing users to food items based on a meal plan.

FIG. 10 is a flowchart of an example method 1000 associated with providing navigation paths for directing users to food items based on a meal plan. In some implementations, an XR device (e.g., XR device 805) may perform or may be configured to perform one or more process blocks of FIG. 10. In some implementations, another device or a group of devices separate from or including the XR device (e.g., server 810) may perform or may be configured to perform one or more process blocks of FIG. 10. Additionally, or alternatively, one or more components of the XR device (e.g., processor 920, memory 930, input component 940, output component 950, and/or communication component 960) may perform or may be configured to perform one or more process blocks of FIG. 10.

As shown in FIG. 10, the method 1000 may include receiving, via an interface of the XR device, an input associated with meals of a user associated with the XR device (block 1010). As further shown in FIG. 10, the method 1000 may include determining, based on the input, a meal plan for the user of the XR device, wherein the meal plan is associated with target meals (block 1020). As further shown in FIG. 10, the method 1000 may include determining, based on recipes for the target meals, a list of food items for preparing the target meals associated with the meal plan (block 1030). As further shown in FIG. 10, the method 1000 may include providing, via the interface, the list of food items and the target meals (block 1040). As further shown in FIG. 10, the method 1000 may include providing, via the interface, an in-store navigation path to direct the user of the XR device via overlayed audio-visual cues to locations within a physical retail store to pick up the food items (block 1050).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein, such as the operations described in connection with FIGS. 1A-1C, 2-6, and 7A-7B.

Figure 11:
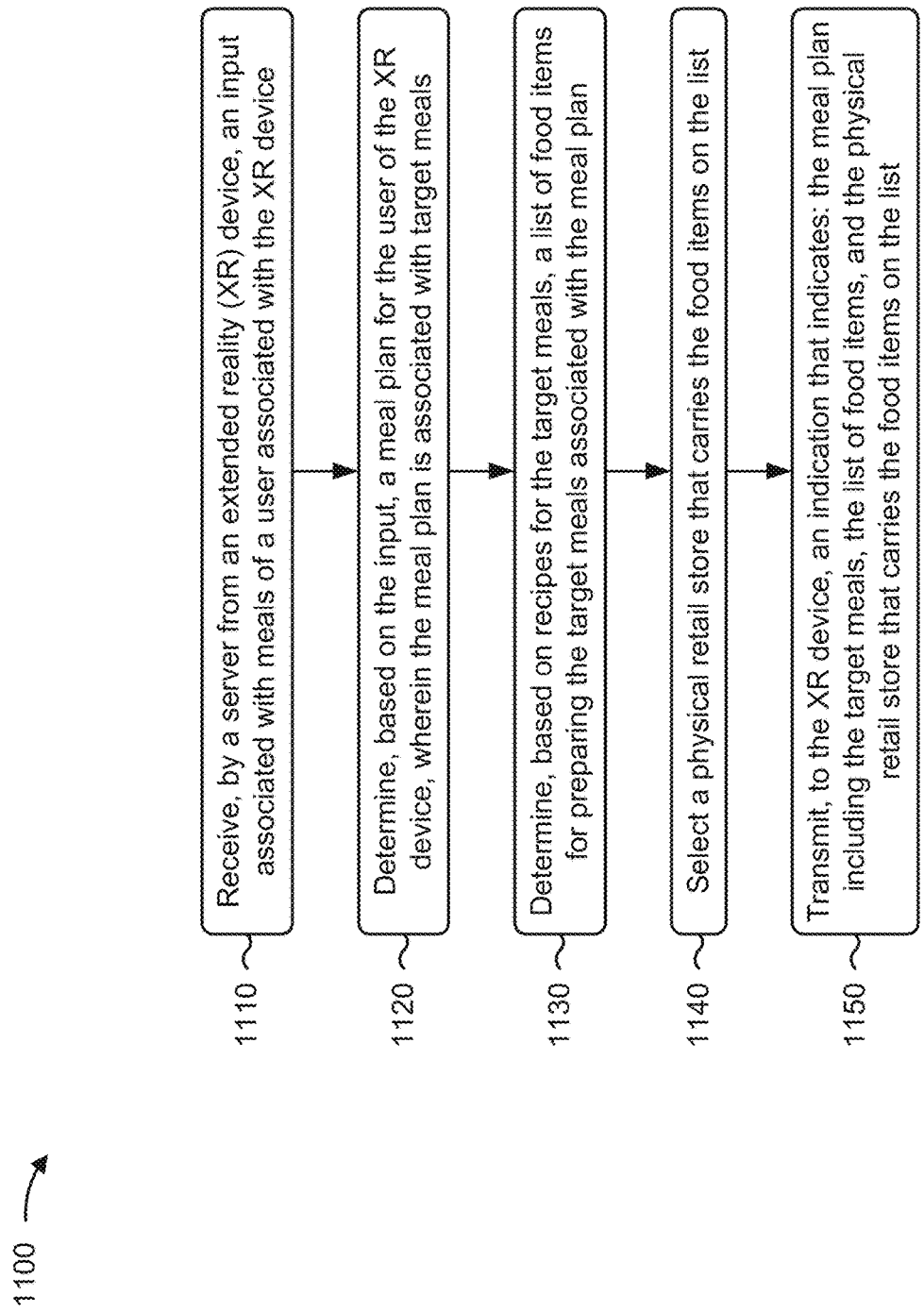

FIG. 11 is a flowchart of an example method 1100 associated with providing navigation paths for directing users to food items based on a meal plan. In some implementations, a server (e.g., server 810) may perform or may be configured to perform one or more process blocks of FIG. 11. In some implementations, another device or a group of devices separate from or including the server (e.g., XR device 805) may perform or may be configured to perform one or more process blocks of FIG. 11. Additionally, or alternatively, one or more components of the server (e.g., processor 920, memory 930, input component 940, output component 950, and/or communication component 960) may perform or may be configured to perform one or more process blocks of FIG. 11.

As shown in FIG. 11, the method 1100 may include receiving, from an XR device, an input associated with meals of a user associated with the XR device (block 1110).

As further shown in FIG. 11, the method 1100 may include determining, based on the input, a meal plan for the user of the XR device, wherein the meal plan is associated with target meals (block 1120). As further shown in FIG. 11, the method 1100 may include determining, based on recipes for the target meals, a list of food items for preparing the target meals associated with the meal plan (block 1130). As further shown in FIG. 11, the method 1100 may include selecting a physical retail store that carries the food items on the list (block 1140). As further shown in FIG. 11, the method 1100 may include transmitting, to the XR device, an indication that indicates: the meal plan including the target meals, the list of food items, and the physical retail store that carries the food items on the list (block 1150).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 1A-1C, 2-6, and 7A-7B.

In some implementations, an extended reality (XR) device includes one or more components configured to: receive, via an interface of the XR device, an input associated with meals of a user associated with the XR device; determine, based on the input, a meal plan for the user of the XR device, wherein the meal plan is associated with target meals; determine, based on recipes for the target meals, a list of food items for preparing the target meals associated with the meal plan; provide, via the interface, the list of food items and the target meals; and provide, via the interface, an in-store navigation path to direct the user of the XR device via overlayed audio-visual cues to locations within a physical retail store to pick up the food items.

In some implementations, a server includes one or more components configured to: receive, from an extended reality (XR) device, an input associated with meals of a user associated with the XR device; determine, based on the input, a meal plan for the user of the XR device, wherein the meal plan is associated with target meals; determine, based on recipes for the target meals, a list of food items for preparing the target meals associated with the meal plan; select a physical retail store that carries the food items on the list; and transmit, to the XR device, an indication that indicates: the meal plan including the target meals, the list of food items, and the physical retail store that carries the food items on the list.

In some implementations, a system includes an extended reality (XR) device comprising one or more components configured to: receive, via an interface of the XR device, an input associated with meals of a user associated with the XR device; and transmit the input to a server; and the server comprising one or more components configured to: receive, from the XR device, the input; determine, based on the input, a meal plan for the user associated with the XR device, wherein the meal plan is associated with target meals; determine, based on recipes for the target meals, a list of food items for preparing the target meals associated with the meal plan; and transmit, to the XR device, an indication of the list of food items and the target meals.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An extended reality (XR) device, comprising:
one or more components configured to:
receive, via an interface of the XR device, an input associated with meals of a user associated with the XR device;
determine, based on the input, a meal plan for the user of the XR device, wherein the meal plan is associated with target meals;
determine, based on recipes for the target meals, a list of food items for preparing the target meals associated with the meal plan;
provide, via the interface, the list of food items and the target meals;
provide, via the interface, an in-store navigation path to direct the user of the XR device via overlayed audio-visual cues to locations within a physical retail store to pick up the food items;
detect, using a camera of the XR device, a food item added to a shopping cart, wherein the food item is not included in the list of food items;
determine a complexity level associated with updating the list of food items based on the food item added to the shopping cart;
transmit, to a server, an indication of the list of food items and the food item added to the shopping cart based on the complexity level satisfying a threshold; and
receive, from the server, an updated list of food items.

2. The XR device of claim 1, wherein the input includes one or more of: a calorie requirement, a meal composition, food preferences, or links to electronic pages describing potential target meals, and wherein the food preferences indicate one or more of: food allergies, food sensitivities, foods to be avoided, foods associated with an increased priority level, preferred food characteristics, or preferred cuisines.

3. The XR device of claim 1, wherein the one or more components, to determine the list of food items, are configured to:
generate a directed graph that includes a first set of nodes corresponding to a plurality of food items, a second set of nodes corresponding to a plurality of target meals, and a third set of nodes corresponding to intermediate steps between the plurality of food items and the plurality of target meals.

4. The XR device of claim 1, wherein the one or more components are configured to:
detect, using the camera of the XR device, a food item in a field of view of the camera, wherein the food item is not included in the list of food items;
identify nutritional information associated with the food item;
determine, based on the nutritional information, whether the food item is aligned with food preferences associated for the user; and
provide, via the interface, an alert indicating that the food item does not align with food preferences.

5. The XR device of claim 1, wherein the one or more components are configured to:
detect, using the camera of the XR device, a second food item added to the shopping cart, wherein the second food item is included in the list of food items; and
provide, via the interface, an indication of remaining food items.

6. The XR device of claim 1, wherein the one or more components are configured to:
remove other food items from the list of food items based on the food item that is added to the shopping cart.

7. The XR device of claim 1, wherein the one or more components are configured to:
select, using store information, the physical retail store based on the list of food items, wherein the store information indicates a plurality of physical retail stores and real-time item inventory information for each of the plurality of physical retail stores.

8. The XR device of claim 1, wherein the one or more components are configured to:
determine additional target meals that are attainable using the food items included in the list of food items, wherein the additional target meals are aligned with the input; and
provide, via the interface, a recommendation that indicates the additional target meals.

9. The XR device of claim 1, wherein the one or more components are configured to:
retrieve, from the server, store mapping information that indicates a map of store aisles and corresponding food items that are available for sale in the store aisles;
determine, using the camera of the XR device, a current location within the physical retail store;
determine a next food item to be purchased from the list of food items;
determine, based on the store mapping information, a next location in the physical retail store that is associated with the next food item; and
provide, via the interface, the in-store navigation path to direct the user via the overlayed audio-visual cues from the current location to the next location associated with the next food item.

10. The XR device of claim 1, wherein the one or more components are configured to:
identify additional food items that, when combined with certain food items included in the list of food items, make additional target meals;
provide, via the interface, a notification of the additional food items, wherein the notification includes an option to accept the additional food items; and
provide, via the interface, the in-store navigation path to direct the user of the XR device via the overlayed audio-visual cues to additional locations within the physical retail store to pick up the additional food items.

11. The XR device of claim 1, wherein the input includes a calorie requirement, and wherein the one or more components are configured to:
look up nutritional information associated with the food item;
determine a remaining number of allowed calories based on the nutritional information associated with the food item and the calorie requirement; and
provide, via the interface, a notification of the remaining number of allowed calories.

12. The XR device of claim 1, wherein the input includes a budget requirement, and wherein the one or more components are configured to:

detect, using the camera, a cost associated with the food item;
determine a remaining budget based on the cost associated with the food item and the budget requirement; and
provide, via the interface, a notification of the remaining budget.

13. The XR device of claim 1, wherein the one or more components are configured to:
detect, using the camera of the XR device, an electronic page that indicates a recipe for a potential target meal, wherein the electronic page indicates food items for preparing the potential target meal, and wherein the meal plan is based on the recipe indicated on the electronic page.

14. The XR device of claim 1, wherein the in-store navigation path is a shortest path for visiting the locations within the physical retail store at which the food items are held.

15. A server, comprising:
one or more components configured to:
receive, from an extended reality (XR) device, an input associated with meals of a user associated with the XR device;
determine, based on the input, a meal plan for the user of the XR device, wherein the meal plan is associated with target meals;
determine, based on recipes for the target meals, a list of food items for preparing the target meals associated with the meal plan;
select a physical retail store that carries the food items on the list;
transmit, to the XR device, an indication that indicates: the meal plan including the target meals, the list of food items, and the physical retail store that carries the food items on the list;
receive, from the XR device, an indication of a food item added to a shopping cart based on a complexity level satisfying a threshold, wherein the food item is not included in the list of food items, and wherein the complexity level is associated with updating the list of food items based on the food item added to the shopping cart; and
transmit, to the XR device, an updated list of food items.

16. The server of claim 15, wherein the one or more components, to determine the list of food items, are configured to:
generate a directed graph that includes a first set of nodes corresponding to a plurality of food items, a second set of nodes corresponding to a plurality of target meals, and a third set of nodes corresponding to intermediate steps between the plurality of food items and the plurality of target meals.

17. The server of claim 15, wherein the one or more components are configured to:
select, using store information, the physical retail store based on the list of food items, wherein the store information indicates a plurality of physical retail stores and real-time item inventory information for each of the plurality of physical retail stores.

18. The server of claim 15, wherein the one or more components are configured to:
determine additional target meals that are attainable using the list of food items, wherein the additional target meals are aligned with the input; and
transmit, to the XR device, a recommendation that indicates the additional target meals.

19. The server of claim 15, wherein the one or more components are configured to:
identify additional food items that, when combined with certain food items included in the list of food items, could make additional target meals; and
transmit, to the XR device, a notification of the additional food items.

20. A system, comprising:
an extended reality (XR) device comprising one or more components configured to:
receive, via an interface of the XR device, an input associated with meals of a user associated with the XR device; and
transmit the input to a server; and
the server comprising one or more components configured to:
receive, from the XR device, the input;
determine, based on the input, a meal plan for the user associated with the XR device, wherein the meal plan is associated with target meals;
determine, based on recipes for the target meals, a list of food items for preparing the target meals associated with the meal plan; and
transmit, to the XR device, an indication of the list of food items and the target meals,
wherein the one or more components of the XR device are configured to:
detect, using a camera of the XR device, a food item added to a shopping cart, wherein the food item is not included in the list of food items;
determine a complexity level associated with updating the list of food items based on the food item added to the shopping cart;
transmit, to the server, an indication of the list of food items and the food item added to the shopping cart based on the complexity level satisfying a threshold; and
receive, from the server, an updated list of food items.

21. The system of claim 20, wherein the one or more components of the XR device are configured to:
provide, via the interface, the list of food items and the target meals; and
provide, via the interface, an in-store navigation path to direct the user of the XR device via overlayed audio-visual cues to locations within a physical retail store to pick up the food items.

22. The system of claim 20, wherein the one or more components of the XR device are configured to:
determine, using the camera of the XR device, a current location within a physical retail store;
determine a next food item to be purchased from the list of food items;
determine, based on store mapping information, a next location in the physical retail store that is associated with the next food item, wherein the store mapping information indicates a map of store aisles and corresponding food items that are available in the store aisles; and
provide, via the interface, an in-store navigation path to direct the user of the XR device via overlayed audio-visual cues from the current location to the next location associated with the next food item.

23. The system of claim 20, wherein:
the one or more components of the server are configured to:

remove other food items from the list of food items based on the food item that is added to the shopping cart.

24. The system of claim 20, wherein the one or more components of the XR device are configured to:
detect, using the camera of the XR device, a food item in a field of view of the camera, wherein the food item is not included in the list of food items;
look up nutritional information associated with the food item;
determine, based on the nutritional information, whether the food item is aligned with food preferences defined for the user; and
provide, via the interface, an alert indicating that the food item does not align with food preferences.

25. The system of claim 20, wherein the input includes one or more of: a calorie requirement, a meal composition, food preferences, or links to electronic pages describing potential target meals.

\* \* \* \* \*